US012378083B2

(12) United States Patent
Pettinga

(10) Patent No.: US 12,378,083 B2
(45) Date of Patent: Aug. 5, 2025

(54) CONVEYOR GAP BLOCKER

(71) Applicant: Flexible Steel Lacing Company, Downers Grove, IL (US)

(72) Inventor: Mark Steven Pettinga, Grandville, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 207 days.

(21) Appl. No.: 18/117,076

(22) Filed: Mar. 3, 2023

(65) Prior Publication Data

US 2023/0278808 A1   Sep. 7, 2023

Related U.S. Application Data

(60) Provisional application No. 63/316,344, filed on Mar. 3, 2022.

(51) Int. Cl.
*B65G 47/66*   (2006.01)
(52) U.S. Cl.
CPC .................... *B65G 47/66* (2013.01)
(58) Field of Classification Search
CPC ........ B65G 47/66; B65G 13/07; B65G 13/11; B65G 47/52; B65G 13/06; B65G 39/12; B29C 48/09
See application file for complete search history.

(56) References Cited

U.S. PATENT DOCUMENTS

| 2,232,081 A | 2/1941 | Sloane |
| 2,237,345 A | 4/1941 | Frentzel, Jr. et al. |
| 2,268,724 A | 1/1942 | Shackelford |

(Continued)

FOREIGN PATENT DOCUMENTS

| CN | 1135668 | 11/1996 |
| CN | 2420247 | 2/2001 |

(Continued)

OTHER PUBLICATIONS

Invitation to Pay Additional Fees and, Where Applicable, Protest Fee, for PCT/US2023/014456, mail date Aug. 14, 2023, 3 pages.

(Continued)

*Primary Examiner* — Gene O Crawford
*Assistant Examiner* — Abby A Jorgensen
(74) *Attorney, Agent, or Firm* — Fitch, Even, Tabin & Flannery LLP

(57) ABSTRACT

In one aspect, a gap blocker having a body configured to be supported in a gap of a roller conveyor by upstream and downstream rollers. The body has an upper blocking portion with upper contact portions for slidingly contacting the upstream and downstream rollers above a narrowest portion of the gap. The body further includes a plurality of laterally spaced upstream leg portions connected to the upper blocking portion and a plurality of laterally spaced downstream leg portions connected to the upper blocking portion longitudinally spaced from the upstream leg portions. The upstream leg portions have upstream distal end portions to be positioned below the narrowest portion of the gap for keeping the body in the gap. The downstream leg portions likewise have downstream end portions to be positioned below the narrowest portion of the gap for keeping the body in the gap.

47 Claims, 27 Drawing Sheets

(56) References Cited

U.S. PATENT DOCUMENTS

| | | |
|---|---|---|
| 2,517,983 A | 8/1950 | Crosland |
| 2,536,961 A | 1/1951 | Smith |
| 2,624,444 A | 1/1953 | Casabona |
| 2,627,960 A | 2/1953 | Eberle |
| 2,862,599 A | 12/1958 | Sinden |
| 2,899,086 A | 8/1959 | Saint-Andre |
| D209,071 S | 10/1967 | Koch |
| 3,345,957 A | 10/1967 | Welch |
| D209,421 S | 11/1967 | Fabian |
| 3,465,489 A | 9/1969 | Monaghan |
| 3,548,996 A | 12/1970 | Ellis |
| 3,587,674 A | 6/1971 | Adkin |
| 3,623,598 A | 11/1971 | Anfossi |
| 3,738,650 A | 6/1973 | Ossenkop et al. |
| 3,878,735 A | 4/1975 | Preuss |
| 3,988,880 A | 11/1976 | Miyazaki et al. |
| 4,096,943 A | 6/1978 | Gentsch |
| 4,132,304 A | 1/1979 | Gent |
| 4,288,208 A | 9/1981 | Kusters |
| 4,579,219 A | 4/1986 | Burkhardt |
| 4,613,036 A | 9/1986 | Bourgeois |
| 4,718,543 A | 1/1988 | Leisner et al. |
| D303,974 S | 10/1989 | Karr |
| 4,901,845 A | 2/1990 | Zoergiebel |
| 4,989,723 A | 2/1991 | Bode et al. |
| 5,009,307 A | 4/1991 | Chance et al. |
| 5,044,485 A | 9/1991 | Loder |
| 5,065,222 A | 11/1991 | Ishii |
| 5,215,182 A | 6/1993 | Garbagnati |
| 5,311,982 A | 5/1994 | Clopton |
| 5,311,983 A | 5/1994 | Clopton |
| 5,320,478 A | 6/1994 | Gonsowski et al. |
| 5,324,582 A | 6/1994 | Goto |
| 5,344,001 A | 9/1994 | Kawaai et al. |
| 5,409,096 A * | 4/1995 | Clopton ............... B65G 17/061 |
| | | 198/460.1 |
| 5,584,373 A | 12/1996 | Layne |
| 5,597,062 A | 1/1997 | Biwer |
| 5,597,063 A | 1/1997 | Bogle et al. |
| 5,695,042 A | 12/1997 | Van Der Burgt |
| D407,174 S | 3/1999 | Baker |
| 5,957,265 A | 9/1999 | Clopton |
| 5,971,129 A | 10/1999 | Stawniak et al. |
| D419,742 S | 1/2000 | Abbestam |
| 6,138,819 A | 10/2000 | Bogle et al. |
| 6,164,435 A | 12/2000 | Coen et al. |
| 6,550,604 B2 | 4/2003 | Maclachlan |
| 6,589,631 B1 | 7/2003 | Suzuki |
| 6,630,633 B1 | 10/2003 | Uber et al. |
| D483,168 S | 12/2003 | McDaniel |
| D484,545 S | 12/2003 | McIlvaine |
| D493,933 S | 8/2004 | Schwagermann |
| 6,848,583 B2 | 2/2005 | Largent |
| 6,896,122 B2 | 5/2005 | Gambrell et al. |
| 6,959,803 B1 | 11/2005 | Layne et al. |
| 7,137,505 B2 | 11/2006 | Stebnicki |
| 7,210,569 B1 | 5/2007 | Tarhan et al. |
| D547,523 S | 7/2007 | Swinderman |
| 7,258,225 B2 | 8/2007 | Hall |
| D553,824 S | 10/2007 | Rijksen |
| 7,287,640 B1 | 10/2007 | Schmutzler |
| 7,413,088 B2 | 8/2008 | Temler |
| 7,523,820 B1 | 4/2009 | Wu et al. |
| D611,673 S | 3/2010 | Andrews |
| 7,673,732 B2 | 3/2010 | Underberg |
| 7,721,874 B2 | 5/2010 | Chen |
| 7,882,944 B1 | 2/2011 | Eubanks |
| D635,847 S | 4/2011 | Olsson |
| D643,709 S | 8/2011 | Olsson |
| 8,042,682 B2 | 10/2011 | Ertel |
| D650,143 S | 12/2011 | Bhosale |
| 8,162,133 B2 | 4/2012 | Ruge |
| 8,196,736 B2 | 6/2012 | Wagner |
| 8,210,341 B2 | 7/2012 | Marshall et al. |
| 8,365,899 B2 * | 2/2013 | McKee ............... B65G 47/66 |
| | | 198/600 |
| 8,567,591 B2 | 10/2013 | Gonzalez |
| 9,022,207 B2 | 5/2015 | Tully et al. |
| 9,022,210 B2 | 5/2015 | Tully |
| 9,027,738 B2 | 5/2015 | Coen |
| 9,290,333 B2 | 3/2016 | Skanse |
| 9,452,896 B2 | 9/2016 | Lee |
| 9,550,625 B2 | 1/2017 | Specht |
| D780,399 S | 2/2017 | Pettinga |
| 9,643,784 B2 | 5/2017 | Guerra |
| 9,663,306 B2 | 5/2017 | Pettinga |
| D789,643 S | 6/2017 | Pettinga |
| 9,694,987 B1 | 7/2017 | Schroader |
| 9,758,317 B2 | 9/2017 | Sammauro |
| D819,921 S | 6/2018 | Pettinga |
| 10,092,122 B2 | 10/2018 | Bing |
| 10,112,131 B2 | 10/2018 | Yoon |
| 10,233,035 B2 | 3/2019 | Pettinga |
| 10,343,853 B2 | 7/2019 | Yasinski |
| 10,376,938 B2 | 8/2019 | Frauenhuber |
| 10,427,891 B2 | 10/2019 | McKee |
| 10,556,755 B2 * | 2/2020 | Pettinga ............... B65G 47/66 |
| 10,646,898 B2 | 5/2020 | Hillerich, Jr. |
| 10,654,652 B1 | 5/2020 | Folickman |
| 10,913,616 B2 | 2/2021 | Pettinga |
| 10,926,955 B1 | 2/2021 | Malina |
| 11,136,194 B2 | 10/2021 | K S |
| 11,186,448 B2 | 11/2021 | Pettinga |
| 11,597,604 B1 | 3/2023 | Simon |
| 11,597,608 B2 | 3/2023 | Pettinga |
| 11,629,010 B1 | 4/2023 | Defant |
| 11,661,283 B2 | 5/2023 | Pettinga |
| 11,713,199 B2 | 8/2023 | Pettinga |
| 12,065,313 B2 | 8/2024 | Pettinga |
| 12,071,314 B2 | 8/2024 | Pettinga |
| 2006/0070966 A1 | 4/2006 | Koudys et al. |
| 2006/0108204 A1 | 5/2006 | Marsetti |
| 2007/0023257 A1 | 2/2007 | Schiesser |
| 2008/0296129 A1 | 12/2008 | Yagi et al. |
| 2010/0108467 A1 | 5/2010 | Barreyre et al. |
| 2010/0230247 A1 * | 9/2010 | McKee ............... B65G 47/66 |
| | | 198/804 |
| 2011/0132725 A1 * | 6/2011 | Marshall ............... B65G 47/66 |
| | | 198/600 |
| 2014/0182733 A1 * | 7/2014 | Mettee, II ............ B65G 13/071 |
| | | 138/111 |
| 2015/0291368 A1 * | 10/2015 | Pettinga ............... B65G 47/66 |
| | | 198/600 |
| 2017/0174444 A1 * | 6/2017 | Schroader ............. B65G 47/66 |
| 2017/0246564 A1 | 8/2017 | Yoon |
| 2017/0275102 A1 * | 9/2017 | Pettinga ............... B65G 47/66 |
| 2023/0098268 A1 | 3/2023 | Pettinga |
| 2023/0102050 A1 | 3/2023 | Pettinga |

FOREIGN PATENT DOCUMENTS

| | | |
|---|---|---|
| CN | 101056807 A | 10/2007 |
| CN | 101074070 A | 11/2007 |
| CN | 101880126 A | 11/2010 |
| CN | 102695662 A | 9/2012 |
| CN | 102887423 A | 1/2013 |
| CN | 203448352 U | 2/2014 |
| CN | 104870340 A | 8/2015 |
| CN | 110691744 | 1/2020 |
| CN | 112010006 A | 12/2020 |
| DE | 3014608 | 10/1981 |
| DE | 3224557 | 1/1984 |
| DE | 8700878 | 3/1987 |
| DE | 9212012 U1 | 12/1992 |
| DE | 19858521 | 6/2000 |
| DE | 202006003116 | 4/2006 |
| EP | 0156113 | 10/1985 |
| EP | 0290255 | 11/1988 |
| EP | 0778229 | 6/1997 |
| EP | 0906879 | 4/1999 |
| EP | 0919493 | 6/1999 |
| EP | 2332865 A1 | 6/2011 |

(56) References Cited

FOREIGN PATENT DOCUMENTS

| | | |
|---|---|---|
| GB | 842230 | 7/1960 |
| GB | 1116571 | 6/1968 |
| GB | 1352993 | 5/1974 |
| JP | H07248011 | 9/1995 |
| JP | H08133459 A | 5/1996 |
| JP | H115264 | 1/1999 |
| JP | H11199038 | 7/1999 |
| JP | 2000177836 | 6/2000 |
| JP | 2001233447 A | 8/2001 |
| JP | 2005261873 | 9/2005 |
| JP | 2005261873 A | 9/2005 |
| JP | 2007155007 | 6/2007 |
| JP | 5181355 | 4/2013 |
| JP | 2019210100 | 12/2019 |
| KR | 101299596 | 8/2013 |
| NL | 2002344 | 6/2010 |
| SU | 590213 | 1/1978 |
| SU | 1159859 | 6/1985 |
| SU | 1328266 | 8/1987 |
| WO | 9856694 A1 | 12/1998 |
| WO | 2011071743 | 6/2011 |
| WO | 2014106062 | 7/2014 |
| WO | 2017111976 | 6/2017 |
| WO | 2018191122 | 10/2018 |
| WO | WO-2018191122 A1 * | 10/2018 ............ B65G 15/30 |
| WO | 2020216783 | 10/2020 |

OTHER PUBLICATIONS

International Search Report and Written Opinion issued for application PCT/US2023/014456, mail date Oct. 27, 2023, 21 pages.
Design U.S. Appl. No. 29/829,490, filed Mar. 4, 2022; 24 pages.
Notification of Transmittal of the International Search Report and the Written Opinion of the International Searching Authority, or the Declaration issued in related International Application No. PCT/US2021/051030 on Feb. 3, 2022, 12 pages.
U.S. Appl. No. 18/125,417, filed Mar. 23, 2023; 45 pages.
U.S. Appl. No. 18/213,678, filed Jun. 23, 2023, 142 pages.
U.S. Appl. No. 29/898,156, filed Jul. 24, 2023, 10 pages.
U.S. Appl. No. 63/528,572, filed Jul. 24, 2023, 25 pages.
U.S. Appl. No. 18/198,942, filed May 18, 2023, 39 pages.
U.S. Appl. No. 18/781,174; Application filed Jul. 23, 2024, entitled "Conveyor Gap Blocker"; 45 pages.
U.S. Appl. No. 18/813,933; Application filed Aug. 23, 2024, entitled "Conveyor Transfer Guards"; 136 pages.

* cited by examiner

CONVEYOR GAP BLOCKER

CROSS-REFERENCE TO RELATED APPLICATION

This application claims the benefit of U.S. Provisional Patent Application No. 63/316,344, filed Mar. 3, 2022, which is hereby incorporated by reference.

FIELD

This disclosure relates to conveyors and, more specifically, to gap blockers that block gaps between conveying surfaces of conveyors.

BACKGROUND

Conveyors have conveying surfaces to support an object and convey the object in a downstream direction along the conveyor. Conveyors often have gaps between conveying surfaces of the conveyor that permit relative movement of the conveying surfaces. The conveying surfaces may be outer surface portions of adjacent belts, outer surface portions of a single belt (e.g., a hitch in the belt), or outer surfaces of adjacent rollers, as some examples.

One type of conveyor system is a roller conveyor. Roller conveyors are used to transfer objects from one location to another, such as packages in a package distribution center or products in a manufacturing environment. Roller conveyors often have rollers that are rotatably supported by a conveyor frame at fixed positions along the conveyor frame. The rollers support an object on the roller conveyor and rotate to convey the object in a downstream direction.

Roller conveyors include passive roller conveyors and active conveyors. Passive roller conveyors utilize gravity or the momentum of an object to move the object across the rollers of the roller conveyor. An active roller conveyor utilizes a drive, such as an electric motor coupled to a rotatable drive member, to rotate the rollers of the roller conveyor and urge an object in a downstream direction along the rollers. For example, the roller conveyor may have rollers, a driver such as a drive belt in contact with the rollers, and the rotatable drive member is a drive roller engaged with the drive belt that moves the drive belt to cause corresponding rotation of the rollers. As another example, a roller conveyor may include rollers with sprockets, a chain engaged with the sprockets, and the rotatable drive member is a drive sprocket that moves the chain to cause rotation of the rollers.

Some roller conveyors have rollers and drive members such as o-rings that engage in grooves of the rollers for transferring rotation from one roller to an adjacent roller. The o-ring extends about the rollers in their grooves and has upper and lower runs that extend across the gap between the adjacent rollers. The areas of the roller conveyor where the o-ring enters the grooves of the rollers create potential pinch points that may be a hazard for workers. For example, a worker's glove may become caught between an o-ring and a roller as a worker attempts to dislodge an object stuck on the conveyor.

Further, an item may fall through one of the gaps between rollers and into an underlying area. Objects that fall through the gaps between rollers may damage an underlying structure, such as jamming a drive pulley that drives the rollers. As another example, a portion of an object such as a corner of a box may become lodged in a gap between rollers. These situations may adversely affect the operation of the roller conveyor and nearby machinery.

SUMMARY

In accordance with one aspect of the present disclosure, a gap blocker is provided for a roller conveyor having upstream and downstream rollers for conveying an object in a downstream longitudinal direction and a gap between the upstream and downstream rollers. The gap blocker includes a body configured to be supported in the gap by the upstream and downstream rollers as the upstream and downstream rollers rotate during operation of the roller conveyor. The body has an upper blocking portion to inhibit the object from falling through the gap. The upper blocking portion has upper contact portions for slidingly contacting the upstream and downstream rollers above a narrowest portion of the gap. The body further includes a plurality of laterally spaced upstream leg portions connected to the upper blocking portion and a plurality of laterally spaced downstream leg portions connected to the upper blocking portion longitudinally spaced from the upstream leg portions. The upstream leg portions have upstream distal end portions to be positioned below the narrowest portion of the gap for keeping the body in the gap. The downstream leg portions likewise have downstream end portions to be positioned below the narrowest portion of the gap for keeping the body in the gap. In this manner, the upstream and downstream leg portions may independently contact the associated upstream or downstream roller to retain the gap blocker in the gap despite localized variations in the outer surfaces of the upstream and downstream rollers.

The present disclosure also provides a gap blocker for being positioned in a gap between upstream and downstream rollers that are rotatable to convey an object in a downstream longitudinal direction across the gap. The gap blocker includes a body to be positioned in the gap. The body has an upstream contact portion for slidingly contacting the upstream roller, a downstream contact portion for slidingly contacting the downstream roller, and opposite lateral side portions extending longitudinally intermediate the upstream and downstream contact portions. One of the lateral side portions of the body includes a lateral biasing member configured to apply a biasing force in a lateral direction against a surface adjacent to the body and maintain a spacing between the body and the surface during operation of the roller conveyor. For example, a second gap blocker may be positioned side-by-side in the gap with the gap blocker and the resilient biasing member engages the second gap blocker to evenly space the gap blockers in the gap. As another example, the roller conveyor includes a side wall and the lateral biasing member of the gap blocker engages the side wall to keep an upper blocking portion of the gap blocker from abutting the side wall and rattling during conveyor operation.

In another aspect, the present disclosure provides a gap blocker system for a roller conveyor having rollers operable to convey an object in a downstream longitudinal direction across a gap between the rollers, the roller conveyor having a conveyor structure adjacent the gap and laterally outward from the rollers. The gap blocker system includes a gap blocker for being positioned in the gap, the gap blocker having contact portions configured to slidingly contact the rollers and support the gap blocker in the gap. The gap blocker has opposite lateral side portions for extending longitudinally in the gap, wherein one of the lateral side portions is configured to be positioned adjacent the conveyor structure when the gap blocker is positioned in the gap. The gap blocker system further includes a retainer configured to keep the one lateral side portion of the gap blocker adjacent the conveyor structure and inhibit lateral movement of the gap blocker away from the conveyor structure during operation of the roller conveyor. The retainer restrains the gap blocker from shifting freely in lateral directions in the gap. For example, a roller conveyor may utilize a single gap blocker in the gap and an upper driver (e.g., an upper run of an o-ring) that extends across the gap. The retainer may be configured to keep the single gap blocker positioned below the upper driver so that the gap blocker obstructs the areas where the upper driver exits a groove of the upstream roller and travels into a groove of the downstream roller. The presence of the gap blocker at these areas keeps a human operator from getting their glove caught in the pinch point where the upper driver travels into the groove of the downstream roller.

The present disclosure also provides a roller conveyor system having a stationary conveyor frame and upstream and downstream rollers rotatably mounted to the conveyor frame. The upstream and downstream rollers are rotatable to convey an object in a downstream direction across a gap between the rollers and are fixed against longitudinal movement. The roller conveyor system includes an elongate gap blocker supported in the gap by the upstream and downstream rollers so that the gap blocker remains at a fixed longitudinal location along the stationary conveyor frame. The gap blocker has a length or longitudinal extent oriented to extend laterally in the gap. The gap blocker has upstream and downstream contact portions for slidingly contacting the upstream and downstream rollers as the upstream and downstream rollers rotate during operation of the roller conveyor system. The gap blocker includes a plurality of laterally spaced upstream leg portions with upstream distal end portions and a plurality of laterally spaced downstream leg portions with downstream distal end portions. The upstream and downstream distal end portions are positioned below a narrowest portion of the gap adjacent the upstream and downstream rollers. Fewer than all of the distal end portions of the upstream leg portions or the downstream leg portions of the gap blocker may contact the adjacent upstream roller or downstream roller as the gap blocker remains in the gap during operation of the roller conveyor system, which reduces friction in the roller conveyor system.

In yet another aspect of the present disclosure, a gap blocker is provided for a roller conveyor having upstream and downstream rollers for conveying an object in a downstream longitudinal direction and a gap between the upstream and downstream rollers. The gap blocker includes an elongate body configured to be supported in the gap by the upstream and downstream rollers as the upstream and downstream rollers rotate during operation of the roller conveyor. The elongate body has a length or longitudinal extent that is oriented to extend laterally with the body in the gap.

The body includes an upper blocking portion to inhibit the object from falling through the gap and upper contact portions of the upper blocking portion for slidingly contacting the upstream and downstream rollers above a narrowest portion of the gap. The body further includes a plurality of laterally spaced upstream leg portions connected to the upper blocking portion and a plurality of laterally spaced downstream leg portions connected to the upper blocking portion longitudinally spaced from the upstream leg portions. The upstream and downstream leg portions have upstream and downstream distal end portions to be positioned below a narrowest portion of the gap for keeping the body in the gap. Because the body is elongated, the multiple upstream and downstream leg portions may be easier to mold than a long, single upstream leg portion and a long, single downstream leg portion. Further, the elongated body may be cut to a desired length by cutting the elongated body in a longitudinal direction through an upstream lateral spacing between a pair of the upstream leg portions and a corresponding downstream lateral spacing between a pair of the downstream leg portions.

DETAILED DESCRIPTION

Figure 1:
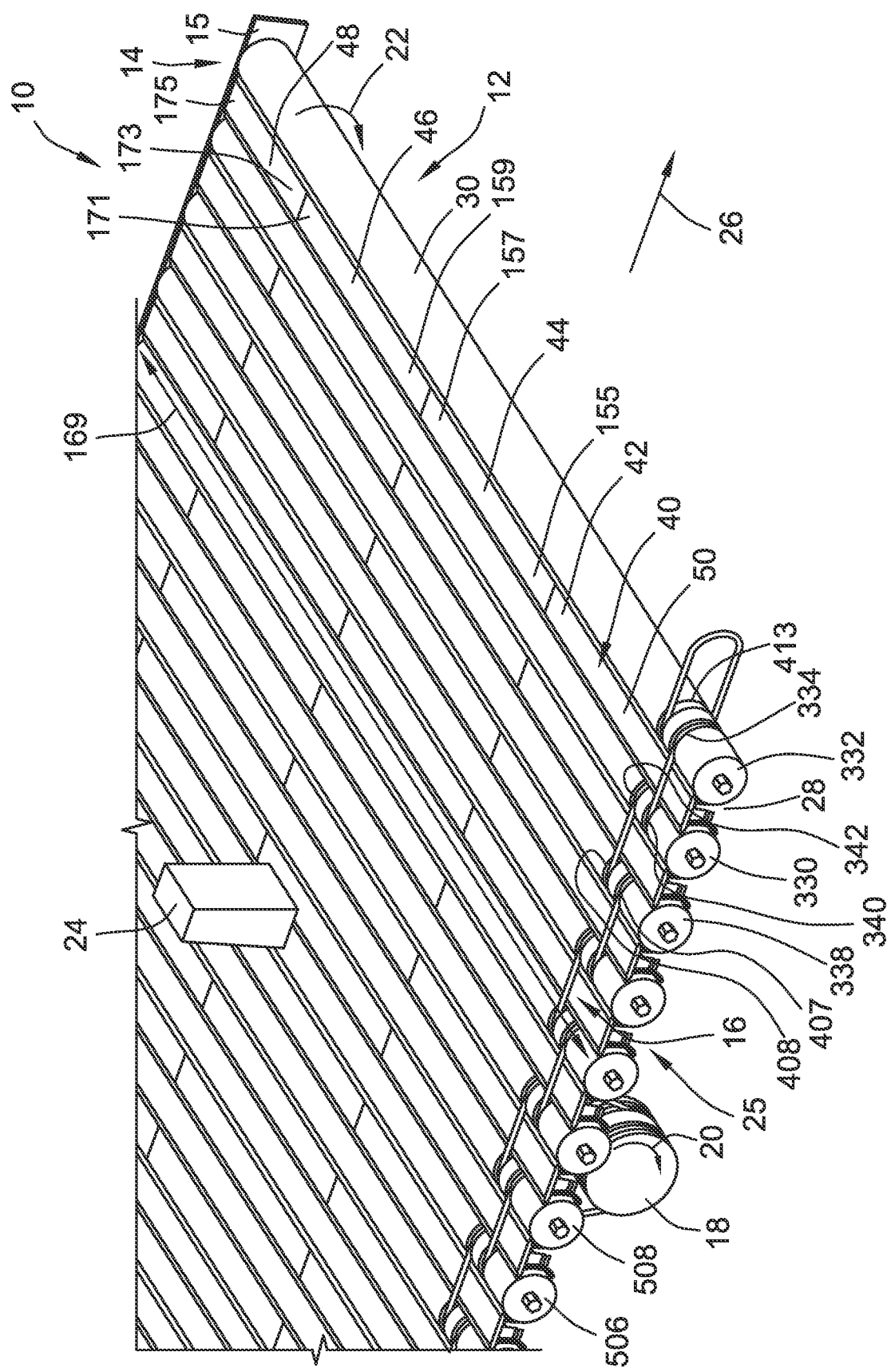
FIG. 1 is a perspective view of a roller conveyor having rollers for conveying an object in a longitudinal, downstream travel direction, gaps between the rollers, gap blockers in the gaps, and o-rings connecting the rollers.

The following discussion refers to a downstream longitudinal direction as the direction an object is conveyed by a conveyor. The conveyor includes conveying surfaces, such as outer surfaces of rollers, and longitudinally extending gaps between the conveying surfaces. The following discussion uses the term laterally to refer to a direction transverse to the longitudinal direction and which extends across the conveying surfaces. For example, the gap blocker 42 in FIG. 1 has a width 162 (see FIG. 2) that extends longitudinally when the gap blocker 42 is installed in a gap 28 (see FIG. 8) between rollers 330, 332. The gap blocker 42 has a length 160 (see FIG. 2) that extends laterally in the gap 28 and along the rollers 330, 332 when the gap blocker 42 is installed in the gap 28.

In one aspect of the present disclosure, a gap blocker is provided for a roller conveyor having upstream and downstream rollers for conveying an object in a downstream longitudinal direction and a gap between the rollers that varies in width. The gap blocker includes a body to be positioned in the gap and an upper blocking portion of the body to inhibit an object carried by the roller conveyor from falling through the gap. The body has upstream and downstream contact portions configured to contact the conveying surfaces above a narrowest portion of the gap. The body has a plurality of resilient, laterally spaced upstream legs with upstream distal end portions to be positioned below the narrowest portion of the gap. The body has a plurality of resilient, laterally spaced downstream legs with downstream distal end portions to be positioned below the narrowest portion of the gap. Each of the upstream and downstream legs are independently movable relative to the upper blocking portion of the body such that the legs may be resiliently deflected out of the way of a localized deviation in an outer surface of the associated upstream or downstream roller. In this manner, the gap blocker is able to remain in the gap despite deviations in the roller outer surfaces. Noise is also decreased in some embodiments as one or two legs may shift out of the way of the localized deviation of the roller outer surface while the remaining legs resist up-and-down movement of the gap blocker and associated chatter of the gap blocker on the roller outer surface.

Further, the ability of the upstream legs and downstream legs to move independently permits an installer to sequentially deflect groups of legs to advance the legs into the gap rather than having to deflect all of the legs at once. Since the installer may be deflecting the legs manually, the reduced force required to bend a few smaller, narrow legs at a time, compared to bending a single resilient leg that extends the full length of the gap blocker, may significantly improve the ease of installation of the gap blocker. Another advantage of the plurality of resilient upstream and downstream legs is that an individual leg may be trimmed to avoid a localized obstacle such as an o-ring or a damaged portion of a roller.

The gap blocker is configured so that when installed between adjacent rollers, an upper surface of the gap blocker will be recessed from peaks of the upstream and downstream rollers so that the upper surface is in clearance with objects conveyed by the upstream and downstream rollers during normal conveyor operation. Should a portion of a conveyed object protrude into the gap below the peaks of the upstream and downstream rollers, the upper surface of the gap blocker is positioned to block the protruding portion from projecting further into the gap and potentially becoming lodged in the gap. Alternatively, for smaller objects, the gap blocker keeps the object from undesirably falling through the gap.

The gap blocker is configured so that the upper surface of the upper blocking portion is seated low enough in the gap to be below an upper run of a drive member, such as an o-ring, connecting adjacent upstream and downstream rollers so that the upper surface does not contact the o-ring upper run and the o-ring can travel freely over and spaced above the gap blocker upper surface in clearance therewith. The drive member may be, for example, an o-ring, a band, or a chain, as some examples. The drive member may be a single, unitary member such as an o-ring made of a polymer material. Alternatively, the drive member may include multiple members such as a cable or a chain. The drive member may be made of metallic and/or plastic materials, as some examples.

In one application, the upper blocking portion of the gap blocker can be installed so that the upper blocking portion extends proximate grooves of the upstream and downstream rollers that receive the o-ring. The upper blocking portion extends across the grooves below the o-ring upper run and obstructs the pinch point formed where the o-ring upper run enters the groove of the downstream roller. Because the upper blocking portion obstructs the pinch point between the upper run of the o-ring and the downstream roller, there is less space for a worker to insert his hand into and potentially have the worker's glove caught between the o-ring and the downstream roller.

Further, the upper blocking portion of the gap blocker provides a lower support for the upper run of the o-ring such that the upper run may be deflected into contact with the upper surface of the upper blocking portion when a conveyed object contacts the o-ring upper run. The upper surface of the upper blocking portion is a predetermined distance below the o-ring upper run, such as immediately below the o-ring upper run, to limit deflection of the o-ring upper run due to contact from the object. The upper blocking portion keeps the upper run of the o-ring from deflecting too far below the peaks of the rollers, which may damage the o-ring, as well as keeping the o-ring from being deflected too far laterally that it disengages from the groove.

The distal end portions of the legs of the gap blocker are configured to be above, and in clearance with, a lower run of the o-ring with the gap blocker seated in the gap. The upper and lower runs of the o-ring and outer surfaces of the upstream and downstream rollers extend about a window opening in the gap between adjacent rollers of the roller conveyor. A lateral side of the gap blocker may be advanced laterally into and through the window opening as the gap blocker is being installed in the gap. Because the upper blocking portion and the leg distal end portions are in clearance with, respectively, the upper and lower runs of the o-ring, the gap blocker may extend the full lateral length of the upstream and downstream rollers without interfering with movement of the o-ring.

Referring to FIG. 1, a conveyor system, such as a roller conveyor 10, is shown that includes rollers 12 rotatably mounted to a conveyor frame 14. The conveyor frame 14 is stationary such as being secured to a floor of a facility via fasteners. In general terms, the frame 14 remains in place while the rollers 12 rotate to move an object 24 in a downstream, longitudinal direction 26. The roller conveyor 10 has o-rings 16 interconnecting the rollers 12 to transfer rotation of a drive pulley 18 in rotary direction 20 into corresponding rotation of the rollers 12 in rotary direction 22. The rotation of the rollers 12 in rotary direction 22 conveys the object 24 in the downstream, longitudinal direction 26. The rollers 12 are separated by laterally extending gaps 25 that provide clearance for outer surfaces 30 of the rollers 12 to rotate without contacting one another. The gaps 25 are stationary due to the rollers 12 being rotatably mounted to the stationary frame 14.

The roller conveyor 10 has one or more gap blockers 40 installed in each of the gaps 25 and supported on the rotating outer surfaces 30 of the rollers 12 to inhibit objects from falling through the gaps 25 or getting lodged between rollers 12 in the gaps 25. The gap blockers 40 are fixed at a position along the frame 14; specifically, each of the gap blockers 40 remains in the corresponding gap 25 during operation of the roller conveyor 10. The gap blockers 40 may vibrate, such as shifting slightly up/down and/or upstream/downstream, in the gaps 25 during operation of the roller conveyor 10 but remain in the gaps 25.

The gap blockers 40 can include multiple gap blockers 42, 44, 46, 48 arranged side-by-side in each gap 25 so that together they extend the full length of the roller 12. One or more of the gap blockers 42, 44, 46, 48 may be cut to length so that the length of the gap blockers 42, 44, 46, 48 taken together in a gap 25 matches a distance between skirts 15 of the frame 14. When installed, the gap blockers 40 have upper surfaces 50 that are recessed from peaks 52 (see FIG. 12) of the rollers 12 by a distance 54 so that the object 24 may be conveyed along the rollers 12 during normal operation of the roller conveyor 10 without contacting the gap blockers 40. If a portion, such as a corner, of an object 24 projects into one of the gaps 25 as the object 24 is being conveyed thereacross, the associated gap blocker 40 is positioned to contact the projecting portion of the object 24 and keep the object 24 from becoming lodged in the gap 25 or, if the object 24 is small enough, from falling through the gap 25.

Figure 2:
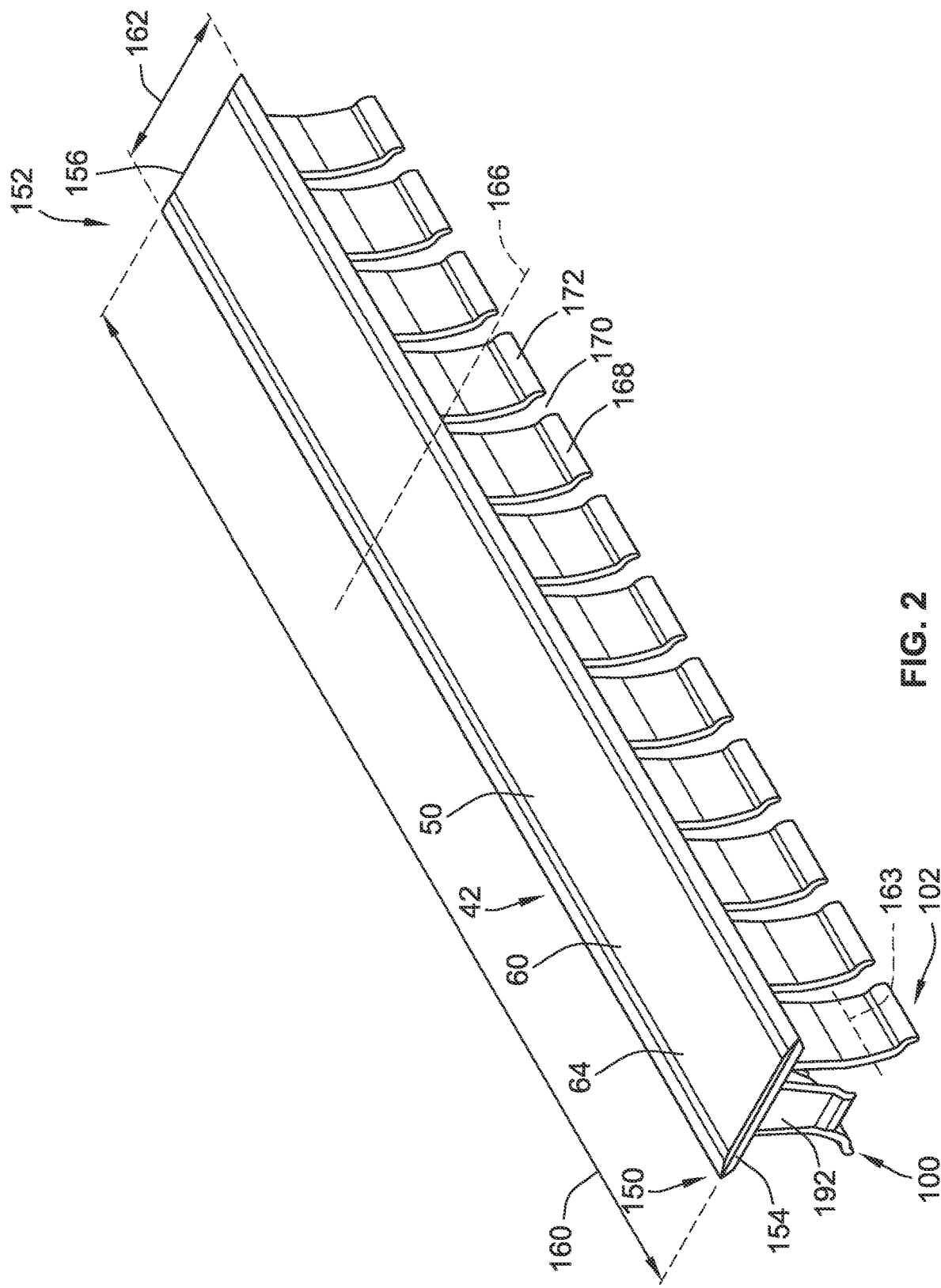
FIG. 2 is a perspective view of one of the gap blockers of FIG. 1 showing an upper bridge portion of the gap blocker sized to extend in the longitudinal, downstream travel direction in a gap between adjacent rollers and downstream legs that are laterally spaced from each other.
Figure 3:
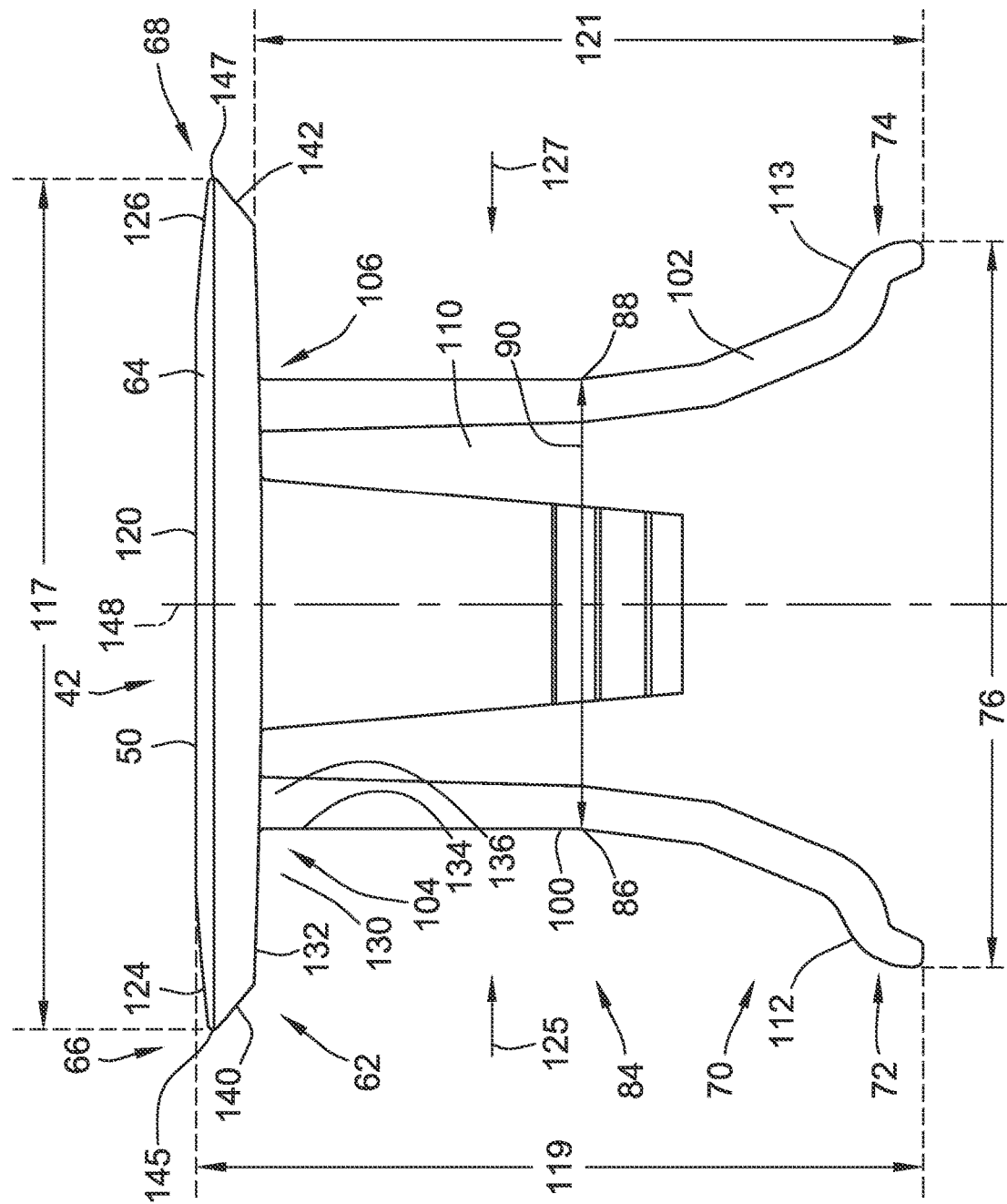
FIG. 3 is a side elevational view of the gap blocker of FIG. 2 showing a longitudinal spacing between upstream and downstream legs of the gap blocker and a biasing arm intermediate the legs.

Regarding FIGS. 2 and 3, the gap blocker 42 is similar to the other gap blockers 40 such that the discussion of the gap blocker 42 herein applies equally to the other gap blockers 40 of the roller conveyor 10. The gap blocker 42 has an elongate body 60 that includes an upper portion 62 having a bridge portion 64 with the upper surface 50 thereon, and upstream and downstream contact portions 66, 68 for slidingly engaging the outer surfaces 30 of the rollers 12. The body 60 includes a lower portion 70 having opposite distal end portions 72, 74, with a maximum outer width 76 of the lower portion 70 being formed between the opposite, distal end portions 72, 74.

The lower portion 70 has an initial configuration wherein the maximum outer width 76 is greater than a minimum distance 78 (see FIG. 8) across a narrowest portion 80 of the associated gap 28. The lower portion 70 has one or more resilient portions thereof that permit the lower portion 70 to be shifted from the initial configuration to a deflected configuration. In the deflected configuration, the maximum outer width 76 of the lower portion 70 is reduced to be less than the minimum distance 78 of the narrowest portion 80 of the associated gap 28 to permit the distal end portions 72, 74 to be advanced through the narrowest portion 80 of the gap 28 and positioned below the narrowest portion 80 of the gap 28. The lower portion 70 may be shifted from the initial configuration to the deflected configuration by, for example, urging one of the distal end portions 72, 74 toward the other distal end portion 72, 74.

The body 60 also includes an intermediate portion 84 between the upper portion 62 and the lower portion 70. The intermediate portion 84 has outer surfaces 86, 88 with a distance 90 therebetween that is less than the minimum distance 78 across the narrowest portion of the associated gap 28. The distance 90 is sized such that, even with the lower portion 70 in an initial, undeflected configuration, the outer surfaces 86, 88 are in clearance with the rollers 332, 340 when the body 60 is positioned in the gap 28 and the distal end portions 72, 74 are below the narrowest portion 80 of the gap 28.

In one form, the body 60 includes upstream legs 100 and downstream legs 102 depending from the bridge portion 64.

The upstream and downstream legs 100, 102 include the distal end portions 72, 74 of the body 60. One or more of the upstream and downstream legs 100, 102 are resilient to permit the lower portion 70 of the body 60 to be shifted from the initial configuration to the deflected configuration so as to permit the body 60 to be positioned in the gap 28. For example, all of the upstream legs 100 are resilient and all of the downstream legs 102 are resilient. In another embodiment, the upstream legs 100 include alternating rigid and resilient legs and the downstream legs 102 include alternating rigid and resilient legs. In yet another embodiment, all of the upstream legs 100 are resilient and all of the downstream legs 102 are rigid.

As can be seen in FIG. 3, the upstream and downstream legs 100, 102 have connections 104, 106 to the bridge portion 64 at longitudinally spaced apart locations such that there is a longitudinal space 110 between the upstream and downstream legs 100, 102. The longitudinal space 110 allows the upstream and downstream legs 100, 102 to shift relative to one another and decrease the maximum outer width of the distal end portions 72, 74 for advancing of the body 60 into the associated gap 28.

The width of the bridge portion 64 is sized relative to a distance between the rotational axes of the rollers 330, 332 and the outer diameters of the rollers 330, 332 to position the gap blocker 42 to sit low enough in the gap 28 that the o-ring upper run 362 may extend across the upper surface 50 without contacting the upper surface 50. Further, the legs 100, 102 have a height sized to position the distal end portions 72, 74 below the narrowest portion 80 of the gap 28 while being in clearance with the o-ring lower run 364. In one embodiment, the rollers 330, 332 have outer diameters of 1.9 inches and a distance 115 (see FIG. 8) of 3 inches between axes of rotation of the rollers 330, 332. Referring to FIG. 3, the bridge portion 64 has a maximum width 117 of 1.7 inches, the gap blocker 42 has a maximum height 119 of 1.45 inches, legs 100, 102 have a height 121 of 1.325 inches, and the maximum outer width 76 of the legs 100, 102 is 1.45 inches with the legs in the undeflected configuration thereof.

Figure 7:
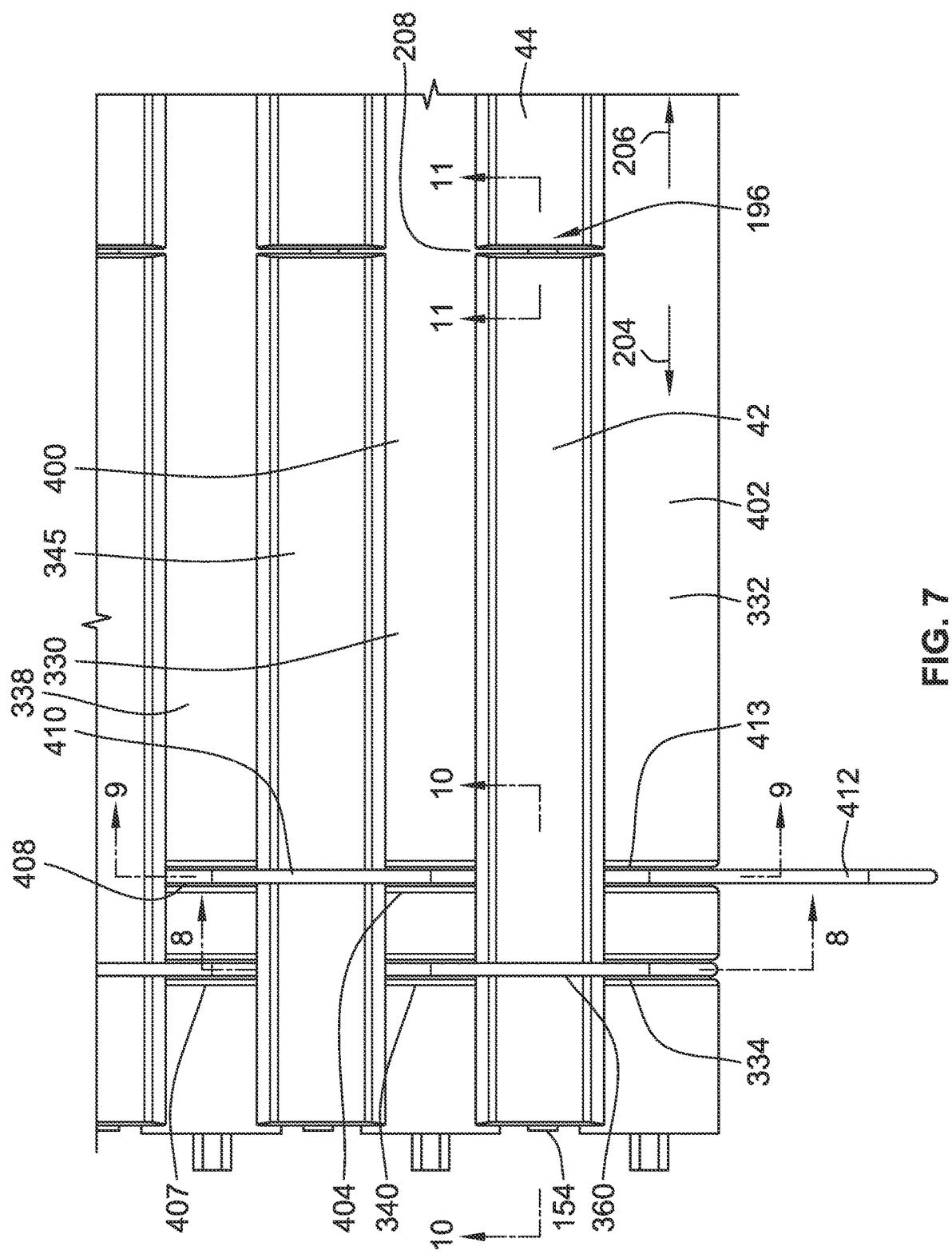
FIG. 7 is a top plan view of rollers of the conveyor system of FIG. 1 showing upper runs of the o-rings extending across the gaps between the adjacent rollers the o-rings connect and above the bridge portions of the gap blockers.
Figure 8:
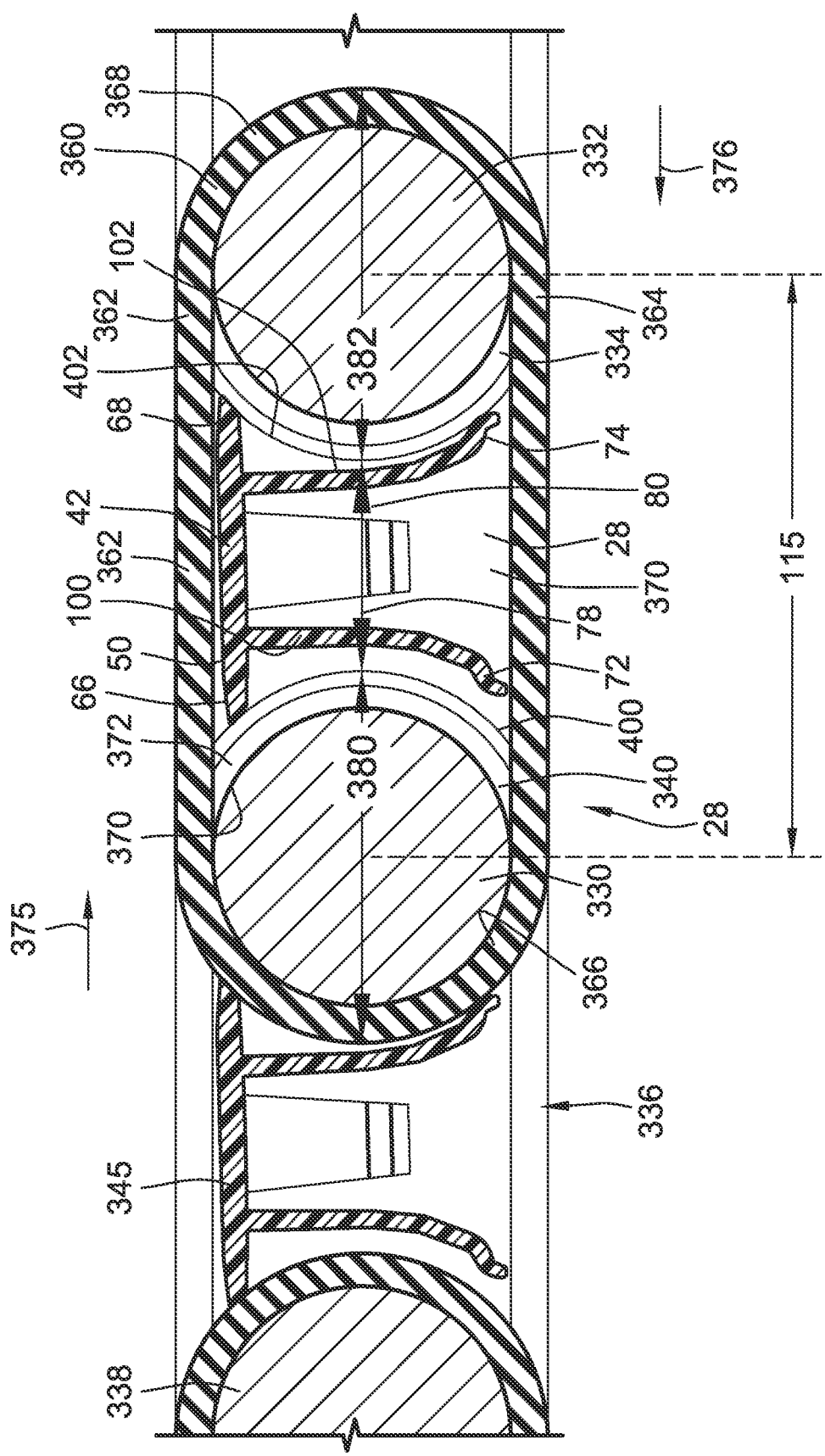
FIG. 8 is a cross-sectional view taken along line 8-8 in FIG. 7 showing the bridge portion of one of the gap blockers below the upper run of one of the o-rings and distal, free end portions of the gap blocker legs above a lower run of the o-ring so that the gap blocker is between the upper and lower runs of the o-ring.

With reference to FIG. 8, one or more of the distal end portions 72, 74 are spaced from the rollers 330, 332 during normal conveyor operation to reduce frictional resistance to rotation of the rollers 330, 332 caused by the gap blocker 42. The distal end portions 72, 74 have contact surface portions 112, 113 positioned so that they can contact outer surfaces 400, 402 (see FIG. 7) of the rollers 330, 332 to stabilize the gap blocker in the gap 28 when there is an irregularity in conveyor operation. Each one of the upstream legs 100 includes one of the contact surface portions 112 and each one of the downstream legs 102 includes one of the contact surface portion 113. For example, a leading edge of a conveyed object 24 may press the contact portion 66 of the gap blocker 42 down against the roller 330 which urges the opposite contact portion 68 away from the roller 332. This causes the contact surface portion 113 (see FIG. 3) to be pivoted upwardly so that it is temporarily in engagement with the outer surface 402 of the roller 332 which will resist lifting of the contact portion 68 off of the roller 330. As another example, one of the rollers 330, 332 may have an imperfection in the outer surface 400, 402 causing one or more of the contact surface portions 112, 113 to contact the associated roller 330, 332 and resist movement of the gap blocker 42 out of the gap 28.

The body 60 of the gap blocker 42 may be of a polymeric material, such as ultra-high molecular weight (UHMW) polyethylene or another plastic, that has a low coefficient of friction for low friction contact with the outer surfaces 30 of the rollers 12 to reduce frictional resistance to rotation of the rollers 12. The material of the body 60 may also be selected to permit the gap blocker 42 to be cut using conventional hand tools, such as a saw, knife, or industrial scissors. The gap blocker 42 may be formed using, for example, injection molding, extrusion, roll forming, a subtractive manufacturing process, or an additive manufacturing process. As another example, a gap blocker in accordance with the present disclosure could be formed by bending sheet metal into a body and utilizing plastic pads on the sheet metal. The plastic pads may be used to provide a reduced coefficient of friction between the gap blocker and the rollers.

As illustrated in FIG. 3, the upper surface 50 includes an inboard, flat surface portion 120 and outboard, inclined surface portions 124, 126. The inboard surface portion 120 is longitudinally intermediate the opposite outboard surface portions 124 and 126. As mentioned, the inboard surface portion 120 is flat such that it extends orthogonal to vertical axis 148 of the gap blocker 42, while the outboard surface portions 124, 126 extend obliquely to the vertical axis 148 and the inboard surface portion 120 and taper downwardly therefrom at either longitudinal end of the inboard surface portion 120.

The contact portions 66, 68 include inclined lower surface portions 140, 142 for contacting the cylindrical outer surfaces of rollers 12. The contact portions 66, 68 have recesses, such as laterally outer recess 270, 274 in FIG. 6, that create thinner and thicker sections of the inclined lower surface portions 140, 142 to reduce contact area between the gap blocker 42 and the rollers 12. Regarding FIG. 3, the contact portions 66, 68 further include junctures 145, 147 between the outboard surface portions 124, 126 and the inclined lower surface portions 140, 142. The junctures 145,147 form a thin edge to minimize the likelihood of a conveyed object catching on the gap blocker 42.

The recesses 270, 274 may also reduce the sound produced by the gap blocker 42 as the rollers 12 rotate. More specifically, surfaces 280, 282, 284 (see FIG. 6) define a general U-shape of the recesses 270, 274. The inclined surface portions 124, 126 provide surfaces to contact an object protruding downward into the gap 28 and traveling in either direction 125, 127. The inclined surfaces 124, 126 urge the object upwardly and onto the flat surface portion 120 to convey the object to the downstream roller 330, 332. In one form, the gap blocker 42 is symmetrical about a laterally extending plane as represented by the vertical axis 148 in FIG. 3. The gap blocker 42 may thereby be positioned in the gap 28 with either contact portion 66, 68 slidingly engaging the upstream roller 330.

Referring to FIG. 2, the gap blocker 42 has opposite lateral side portions 150, 152 that include lateral side surfaces 154, 156 of the bridge portion 64. The gap blocker 42 has an overall length 160 extending between the lateral side portions 150, 152 and an overall width 162 extending perpendicular to the length 160. The gap blocker 42 may be cut to a desired length so that the side-by-side gap blockers 40 in a gap may extend the entire length 169 (see FIG. 1) of the outer surfaces 30 of the associated rollers 12. Because one of the gap blockers 40 may be cut to a desired length during installation, the side-by-side gap blockers 40 may be installed to extend the entire length 169 of the outer surfaces 30 of the rollers 12 despite the full length 169 not being a multiple of the length 160 of the individual gap blockers 40.

For example, the gap blocker 42 may be cut along line 166 at a lateral space 170 between the downstream legs 168, 172. The lateral space 170 is aligned with a corresponding lateral space 174 (see FIG. 4) between upstream legs 176, 178 as well as a recess 180 in an underside of the bridge portion 64. Having the cut along the line 166 aligned with the lateral spaces 170, 174, as well the recess 180, allows the installer to cut through less material for cutting the gap blocker 42 to a desired length.

For some installations, one or more of the resilient upstream and downstream legs 100, 102 may be cut to accommodate an adjacent structure. For example, one of the downstream legs 102 may be cut along line 163 to remove a distal end of the leg 102 and accommodate an upper run of an o-ring (which would provide additional o-ring clearance such as for the installation shown in FIG. 15). As another example, one or more of the upstream and/or downstream legs 100, 102 may be cut off to provide clearance for a damaged roller. As yet another example, one of the lateral spacings 170, 174 may be widened by removing material from one of the adjacent legs to provide clearance for a run of an o-ring to extend therethrough.

Figure 4:
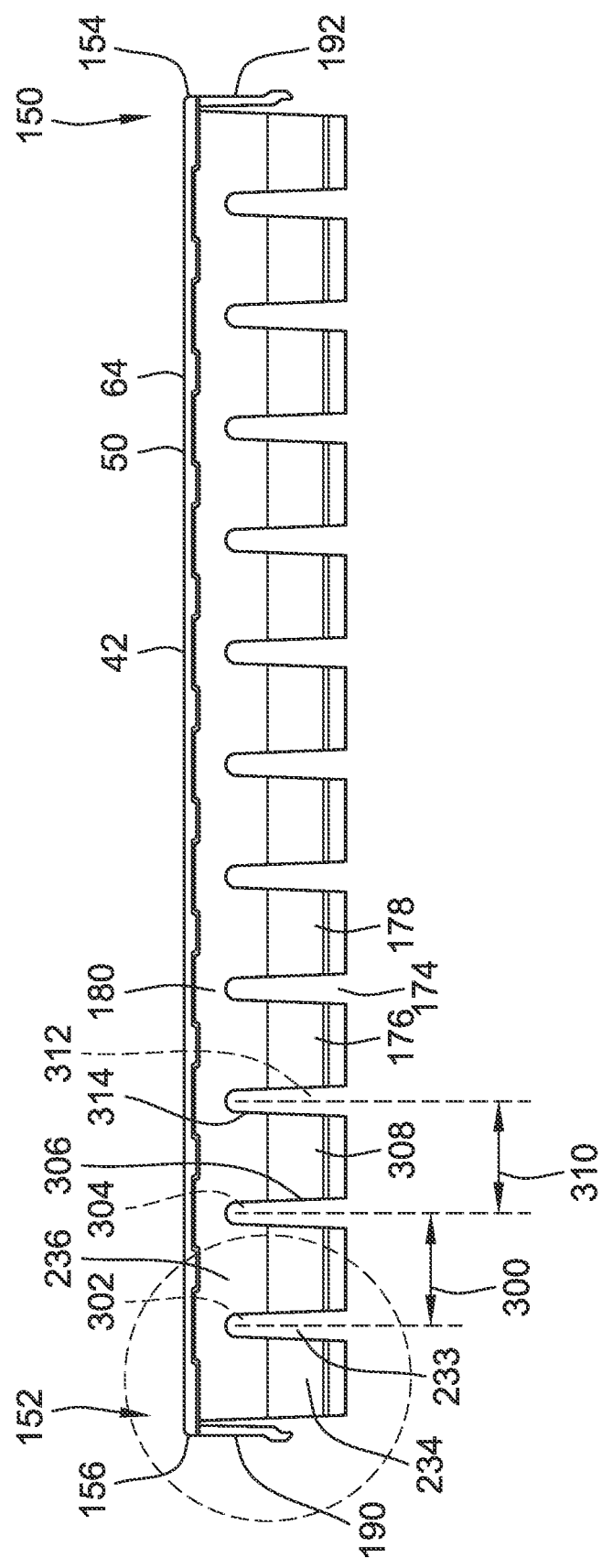
FIG. 4 is a front elevational view of the gap blocker of FIG. 2 showing upstream legs of the gap blocker, lateral spaces between the adjacent upstream legs, and biasing arms extending laterally from opposite lateral sides of the bridge portion.
Figure 5:
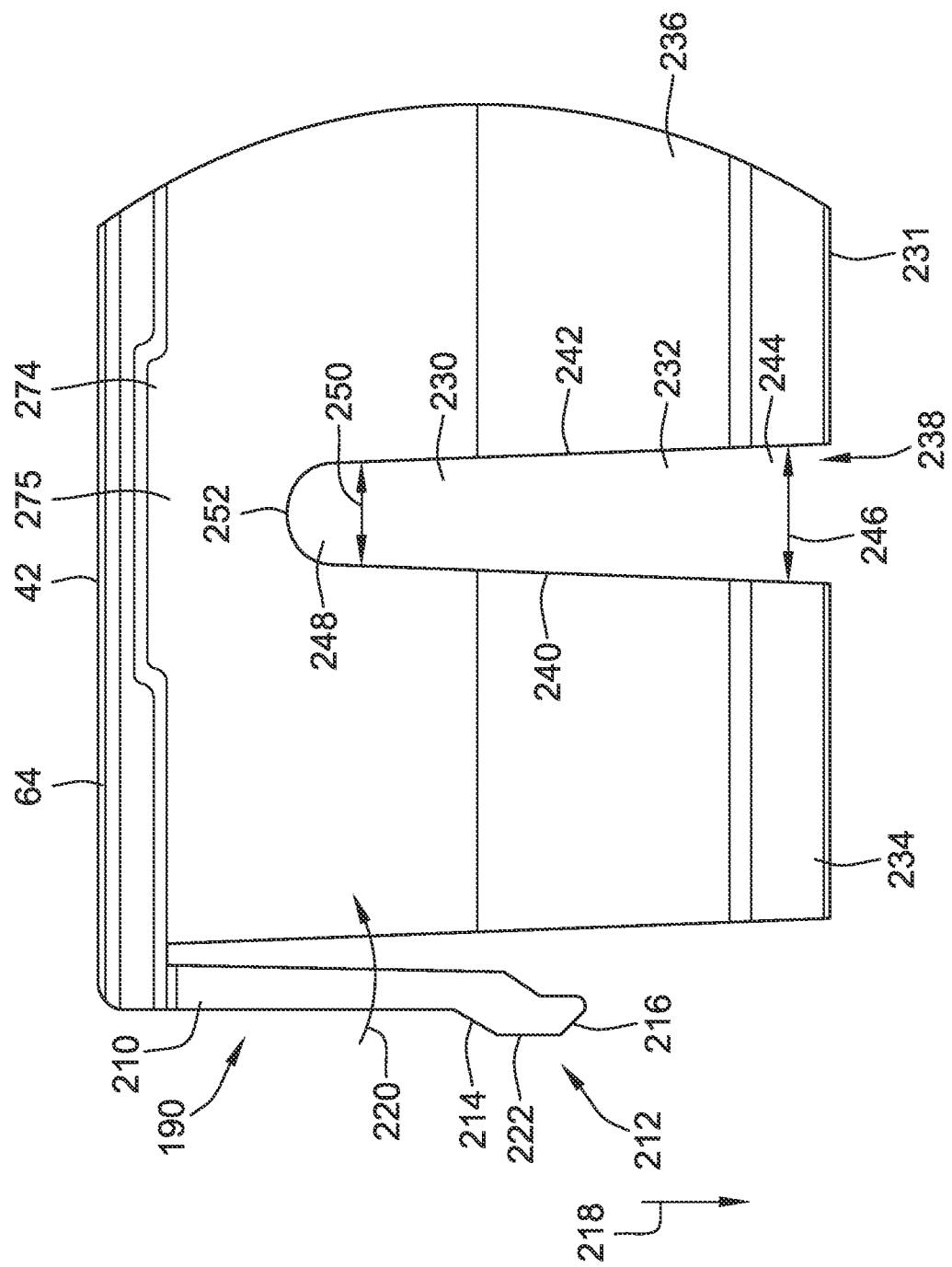
FIG. 5 is an enlarged view of the area shown in the dashed circle in FIG. 4 showing the biasing arm having a lower, free end configured to engage the biasing arm of a laterally adjacent gap blocker in the associated gap.

With reference to FIGS. 4 and 5, the lateral side portions 152, 150 of the gap blocker 42 has biasing members, such as resilient arms 190, 192, that depend downwardly and cooperate to form resilient junctures 196 (see FIG. 7) with adjacent gap blockers 40 or conveyor structure such as skirts 15. Referring to FIG. 7, the resilient juncture 196 urges the gap blockers 42, 44 apart in opposite lateral directions 204, 206. The gap blockers 44, 46, 48 have corresponding resilient arms 190, 192 that are deflected or compressed with the gap blockers 42, 44, 46, 48 in the gap 28 and form resilient junctures at side portions 157, 159, 171, 173, and 175 (see FIG. 1). More specifically, the resilient junctures formed between the gap blockers 42, 44, 46, 48 firmly engage the lateral side portion 150 of the gap blocker 42 against a skirt of the frame 14, engages the lateral side portion 152 of the gap blocker 42 against the lateral side portion 155 of gap blocker 44, engages the lateral side portion 157 of the gap blocker 44 against the lateral side portion 159 of adjacent gap blocker 46, engages a lateral side portion 171 of gap blocker 46 against the lateral side portion 173 of gap blocker 48, and engages lateral side portion 175 of gap blocker 48 with skirt 15. The resilient deformation of the arms 190, 192 provides an even spacing of the gap blockers 40 laterally across the gap 28 by taking up uneven spacing 208 between the facing, lateral side surfaces 154 and 156 (see FIG. 2) of the adjacent the gap blockers 42, 44, 46, 48.

Returning to FIG. 5, the resilient arm 190 includes a base portion 210 depending from the bridge portion 64 and a free end portion 212 opposite the base portion 210. The free end portion 212 includes an upper inclined surface portion 214 and a lower inclined surface portion 216 that extend obliquely to the vertical axis 148 and oppositely to each other. The lower inclined surface portion 216 may cammingly engage the upper inclined surface portion 214 of a laterally adjacent gap blocker 44 in the gap 28 as the gap blocker 42 is shifted downwardly in direction 218 into the gap 28. The camming engagement between the lower inclined surface portion 216 of the resilient arm 190 of the gap blocker 42 and the upper inclined surface portion 214 of the adjacent resilient arm 192 of the laterally adjacent gap blocker 44 urges the free end portion 212 in direction 220. The corresponding resilient arm 192 of the gap blocker 44 is similarly urged inwardly toward the adjacent legs 100, 102 in a direction opposite to direction 220. Once the gap blocker 42 has been seated in the gap 28, the resilient arm 190 is deflected and the resiliency of the arm 190 urges a contacting surface portion 222 of the free end portion 212 into abutment against the corresponding contacting surface portion 222 of the laterally adjacent gap blocker 44 to create a biasing force which urges the gap blockers 42, 44 apart and evenly positions the gap blockers 42, 44 laterally across the gap 28.

Referencing FIGS. 5 and 6, the gap blocker 42 has open-ended slots 230 that are each open between the lowermost surfaces 231 of downstream legs 234, 236 and extends upwardly therefrom to a closed end of the slot 230 below the bridge portion 64 so as to form a lateral space 238 between the legs 234, 236. The lateral space 238 has a varying distance in a lateral direction between side surface portions 240, 242 of the legs 234, 236. Specifically, the lateral space 238 has a lower portion 244 spaced at a first distance 246 and an upper portion 248 spaced at a second distance 250 thereacross that is less than the first distance 246. The side surface portions 240, 242 are inclined relative to one another to provide the wider lower portion 244 and are connected by an arcuate end surface portion 252 at the closed end of the slot 230. The wider lower portion 244 makes it easier for an installer to position the downstream legs 234, 236 on either side of an o-ring connected to a drive pulley, as will be described hereinafter referencing FIGS. 12-15. The body 60 has an upper wall portion 275 extendedly above the arcuate end surface portion 252 to interconnect the legs 234, 236 which provides rigidity for the otherwise resilient legs.

Figure 6:
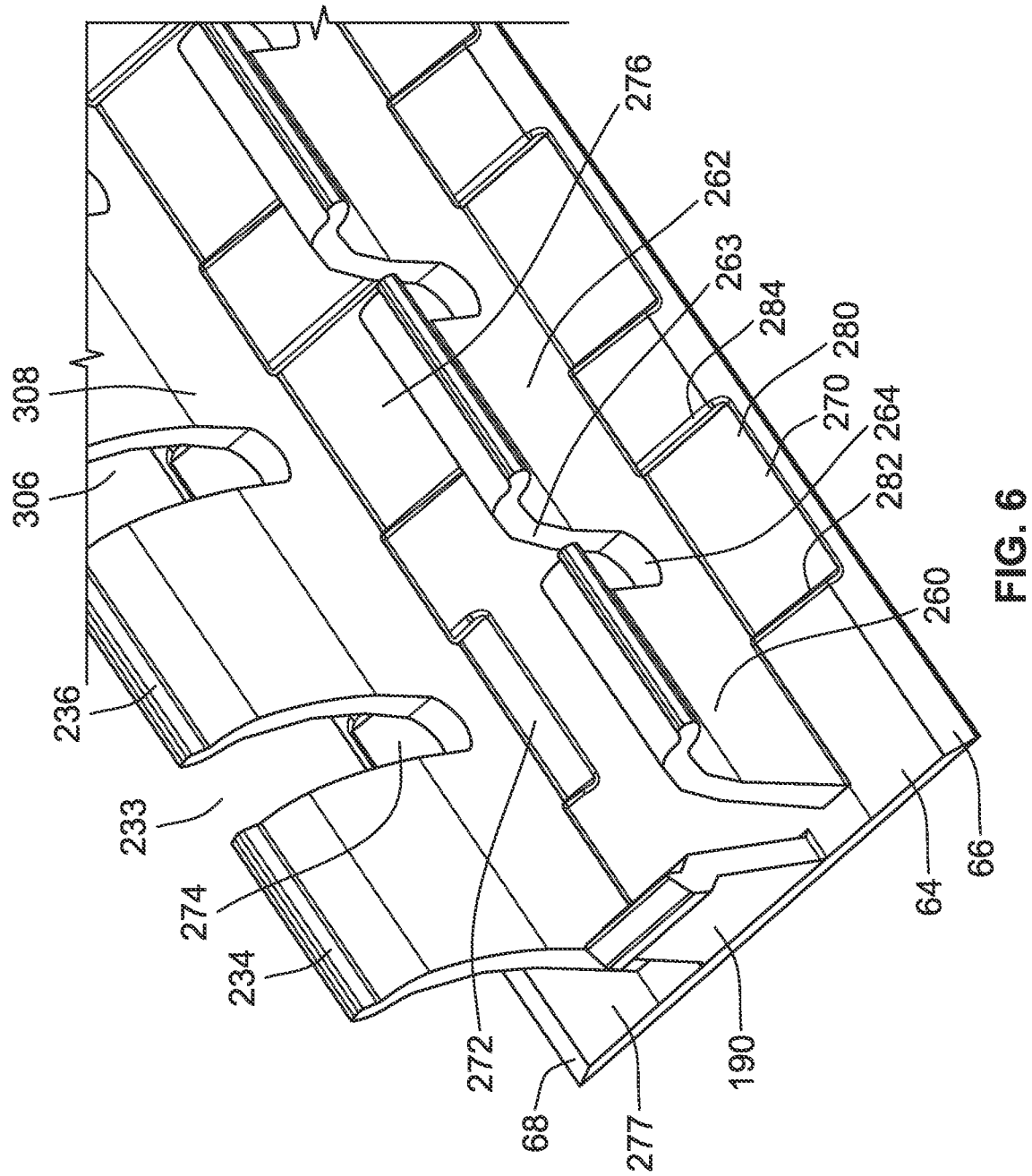
FIG. 6 is a bottom perspective view of the gap blocker of FIG. 2 showing recesses in an underside of the bridge portion longitudinally aligned with lateral spaces between upstream and downstream legs of the gap blocker.

Referencing FIG. 6, it can be seen that the upstream legs 260, 262 likewise have open end slots 263 that include a lateral space 264 with a varying width in the lateral direction as the space 264 extends along the upstream legs 260, 262. The bridge portion 64 has a lower surface 277 with recesses 270, 272, 274 longitudinally aligned with the lateral space 232, 264 to reduce the material for cutting the gap blocker 42 in a longitudinal direction (see, e.g., the cut along line 166 in FIG. 2). In one form, the bridge portion 64 includes a recessed surface 280 and side surfaces 282, 284 along opposite lateral sides of the recessed surface 280 which cooperate to form a generally U-shaped profile of the recess 270. The recesses 272, 274, 276 have similar surfaces to form the shape of the recess.

As illustrated in FIG. 4, the downstream legs 234, 236, and 308 are laterally spaced along the gap blocker 42 so that there is a distance 300 between a lateral center 302 of the open-ended slot 233 between downstream legs 234, 236 and a lateral center 304 of an open-ended slot 306 between downstream legs 236, 308. The spacing 300 is similar to or the same as a spacing 310 between the center 304 of the slot 306 and a lateral center 312 of an open-ended slot 314 between the downstream legs 308, 176. The even spacing 300, 310 provides even increments for an installer to cut the gap blocker 42 down to size for a particular installation. For example, the distances 300, 310 may each be one inch. In one form, all the lateral spacings between the upstream legs 100 have a uniform first spacing between the centers of the open-ended slots, and all the lateral gap spacings between the downstream legs 102 have a uniform second spacing between the centers of the open-ended slots so that the upstream legs 100 can be longitudinally aligned with a corresponding downstream leg 102. The uniform first spacing and the uniform second spacing may be equal to provide even spacing of the legs 100, 102 along the entire gap blocker 42.

Referring to FIG. 8, the gap blocker 42 is shown in the gap 28 between rollers 330, 332 and a gap blocker 345 is shown in a gap 336 between the roller 330 and a roller 338. As can be seen in FIGS. 1 and 7, the roller 330 has a laterally outer groove 340 and a laterally inner groove 404; the roller 332 has a laterally outer groove 334 and a laterally inner groove 413; the roller 338 has a laterally outer groove 407 and a laterally inner groove 408. The grooves 334, 340, 404, 407, 408, and 413 are all formed in the outer surface of their respective rollers to extend about the entire circumference thereof so as to have an annular configuration. The annular grooves 404, 408 of rollers 330, 338 receive a drive member, such as o-ring 360, and the annular grooves 340, 334 of rollers 330, 332 receive o-ring 360.

With reference to FIG. 8, the o-ring 360 is shown engaged in the laterally outer annular grooves 340, 344. The o-ring 360 has an upper run 362, a lower run 364, and curved portions 366, 368 connecting the upper and lower runs 362, 364 as it travels around the rollers 330, 332 in the annular grooves 340, 334. The gap blocker 42 is configured so that the upper surface 50 of the gap blocker 42 is below and in clearance with the upper run 362 and the distal end portions 72, 74 are above and in clearance with the lower run 364 of the o-ring 360. In this manner, the gap blocker 42 fits through a window opening 370 defined between outer surfaces 400, 402 of the rollers 330, 332 and the upper and lower runs 362, 364 of the o-ring 360.

As shown in FIG. 8, the upstream and downstream contact portions 66, 68 of the gap blocker 42 slidingly engage the outer surfaces 400, 402 of the rollers 330, 332 to extend across and on either side of the grooves 340, 344 to support the gap blocker 42 in the gap 28. One or more of the distal end portions 72, 74 may be spaced from the rollers 330, 332 during normal conveyor operation to reduce frictional resistance of the gap blocker 42 to rotation of the rollers 330, 332.

The grooves 340, 344 each have a radially inner surface portion 370 and side surface portions 372 that form a generally U-shaped cross-section of the grooves 340, 344. The o-ring 360 exits the groove 340 of the roller 330 near the top of the roller 330 and travels in direction 375 into the groove 344 near the top of the roller 332. Similarly, the lower run 364 exits the groove 344 at the bottom of the roller 332 and travels in direction 376 into the groove 340 of the roller 330. The rollers 330, 332 have horizontal center lines 380, 382 extending perpendicular to their rotational axes and corresponding in size to the outer diameters of the rollers 330, 332, the horizontal center lines 380, 382 extend parallel to the downstream longitudinal direction 26 and are aligned with the narrowest portion 80 of the gap 28 as can be seen in FIG. 8. The upstream and downstream legs 100, 102 of the gap blocker 42 extend downwardly in the gap 28 to position the distal end portions 72, 74 thereof below the horizontal center lines 380, 382 of the rollers 330, 332.

Figure 9:
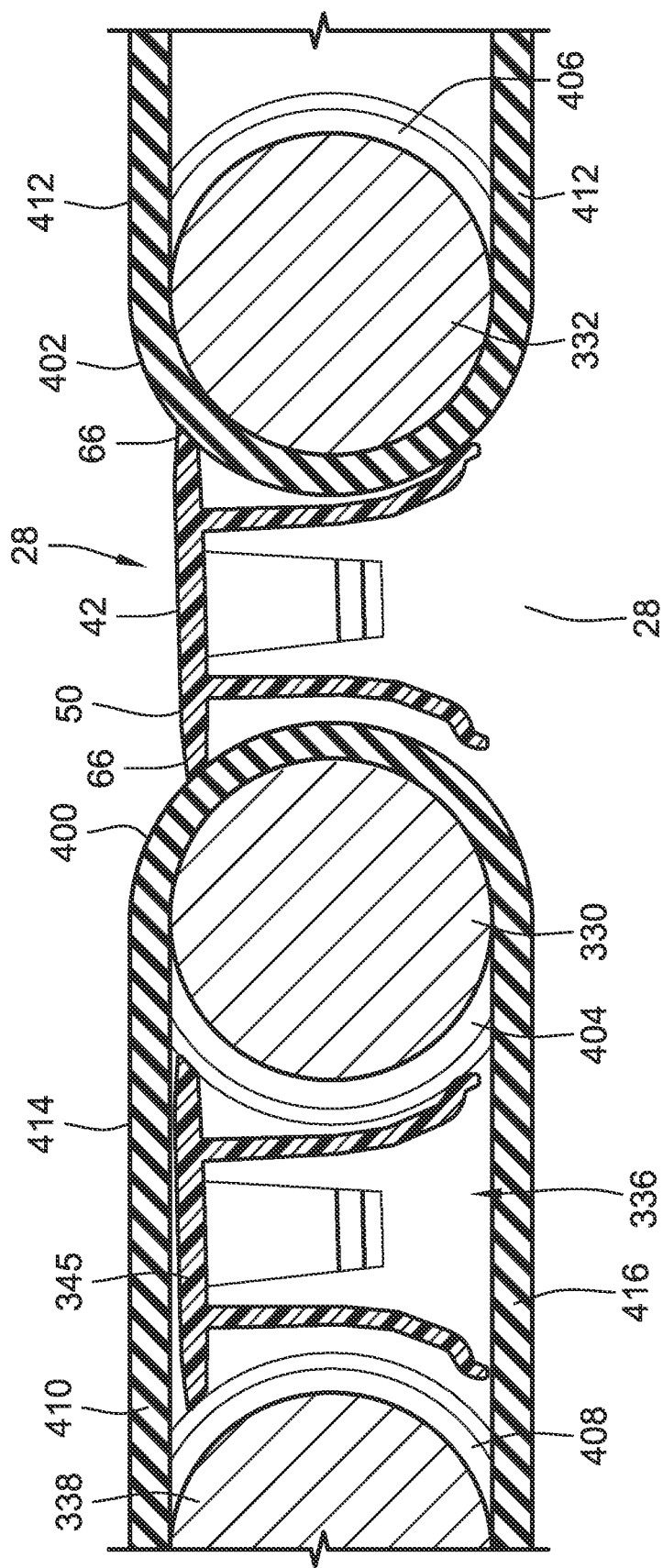
FIG. 9 is a cross-sectional view taken along line 9-9 in FIG. 7 showing the gap blocker of FIG. 8 with the distal free end portions of the legs below a narrowest portion of the gap to retain the gap blocker in position in the gap.

Regarding FIGS. 7 and 9, the gap blocker 42 is shown with the contact portions 66, 68 slidingly engaged with the outer surfaces 400, 402 of the rollers 330, 332. At the lateral location along the length of the rollers 330, 332 of the cross-section of FIG. 9, there is no drive belt extending above and across the upper surface 50 of the gap blocker 42. Due to the alternating inner/outer lateral positioning of the o-rings on the rollers 12 (see FIG. 7), the o-ring 410 has upper and lower runs 414, 416 extending above and below the gap blocker 345 at the lateral location of the cross-section of FIG. 9.

The gap blocker 42 is normally or most commonly in the orientation of FIG. 9 during operation of the roller conveyor 10. Due to deviations in the profiles of the rollers 330, 332, or impacts from an object, the gap blocker 42 may temporarily deviate from the position shown in FIG. 9. For example, the upstream contact portion 66 may shift upward, downward, upstream, and/or downstream when the upstream contact portion 66 contacts an imperfection in the outer surface of the roller 330. In response, one or more of the leg distal end portions 72, 74 of the gap blocker 42 may contact the roller 330 and/or roller 332 to settle the gap blocker 42 back to the normal orientation of FIG. 9.

Figure 10:
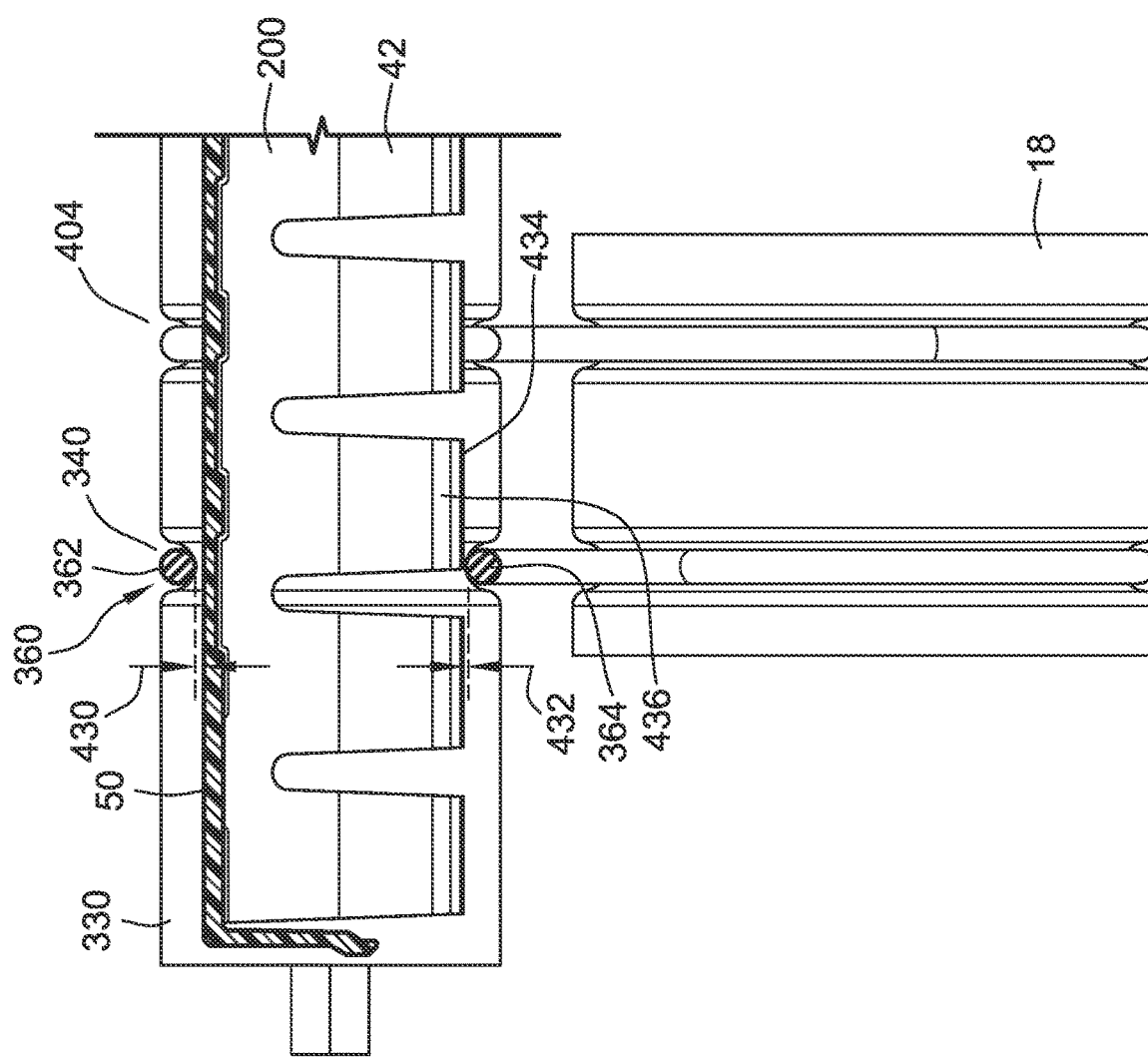
FIG. 10 is a cross-sectional view taken along line 10-10 in FIG. 7 showing a drive pulley below the rollers and drive o-rings extending from the drive pulley upward to the rollers.

As shown in FIG. 10, the upper run 362 of the o-ring 360 is spaced by a distance 430 above the upper surface 50 of the gap blocker 42. The upper surface 50 is positioned to contact an underside of the upper run 362 in the event the upper run 362 is deflected by a conveyed object. The upper surface 50 resists deflection of the upper run 362 in a downward direction beyond the distance 430 to the upper surface 50 which protects the o-ring 360 from excessive deformation and keeps the o-ring 360 engaged in the grooves 340, 334. Further, a lower end surface 434 of an upstream leg 436 of the gap blocker 42 is spaced by a distance 432 above the lower run 364 of the o-ring 360 with the gap blocker 42 seated in the gap 28.

Figure 11:
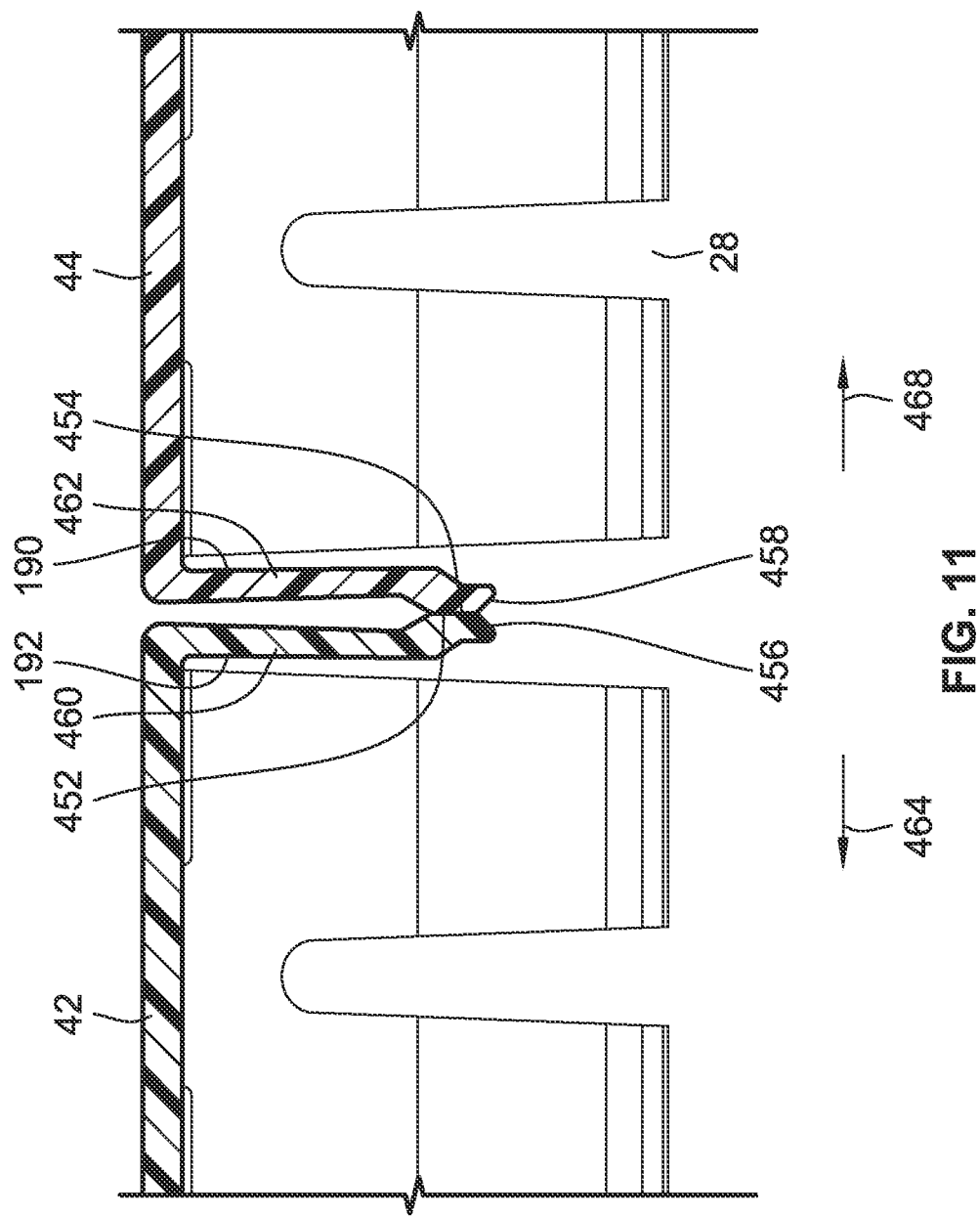
FIG. 11 is a cross-sectional view taken along line 11-11 in FIG. 7 showing the biasing arms of laterally adjacent gap blockers resiliently engaged with each other to be deflected toward the adjacent, endmost leg of its gap blocker which urges the gap blockers apart.

Regarding FIG. 11, the lateral ends of the laterally adjacent gap blockers 42, 44 are shown with resilient arms 190, 192 in a deflected configuration thereof. More specifically, the resilient arms 190, 192 have contacting surfaces 452, 454 so that the arms 190, 192 are in a resiliently deflected, loaded configuration and the gap blockers 42, 44 are installed in the gap 28 along with gap blockers 46, 48 as shown in FIG. 1. The resilient arms 190, 192 have lower inclined surfaces 456, 458 extending apart from one another as the inclined surfaces 456, 458 extend away from the contacting surfaces 452, 454. The clash between the resilient arms 190, 192 bends intermediate portions 460, 462 of the resilient arms 190, 192. The bending of the resilient arms 190, 192 creates bias forces that act in directions 464, 468 to urge the gap blockers 42, 44 apart. The clash between the resilient arms 190, 192 of the gap blockers 42, 44, 46, 48 across the gap 28 takes up any uneven lateral spacing between the lateral side surfaces 154, 156 of laterally adjacent gap blockers 42, 44, 46, 48 and the skirts 15 so that the gap blockers 42, 44, 46, 48 are evenly spaced apart along the rollers 330, 332. The uniform lateral spacing between the gap blockers 42, 44, 46, 48 provided by the engaged resilient arms 190, 192 limits one of the lateral gaps between the gap blockers 42, 44, 46, 48 from being larger than the other lateral gaps. A large lateral gap between the gap blockers 42, 44, 46, 48 may be undesirable in some applications because the large lateral gap provides a recess for objects to catch on and/or for labels of the objects to become adhered thereto. Another advantage provided by the clash between the resilient arms 190, 192 is that the gap blockers 42, 44, 46, 48 are maintained in position along the rollers 330, 332 which keeps the gap blockers 42, 44, 26, 48 from moving to an undesirable location. For example, if one of the gap blockers 42, 44, 46, 48 has a cut leg to provide clearance for a run of an o-ring, the clash between the resilient arms 190, 192 keeps the gap blocker 42, 44, 46, 48 in position and the cut leg aligned thereof with the run of the o-ring.

Figure 12:
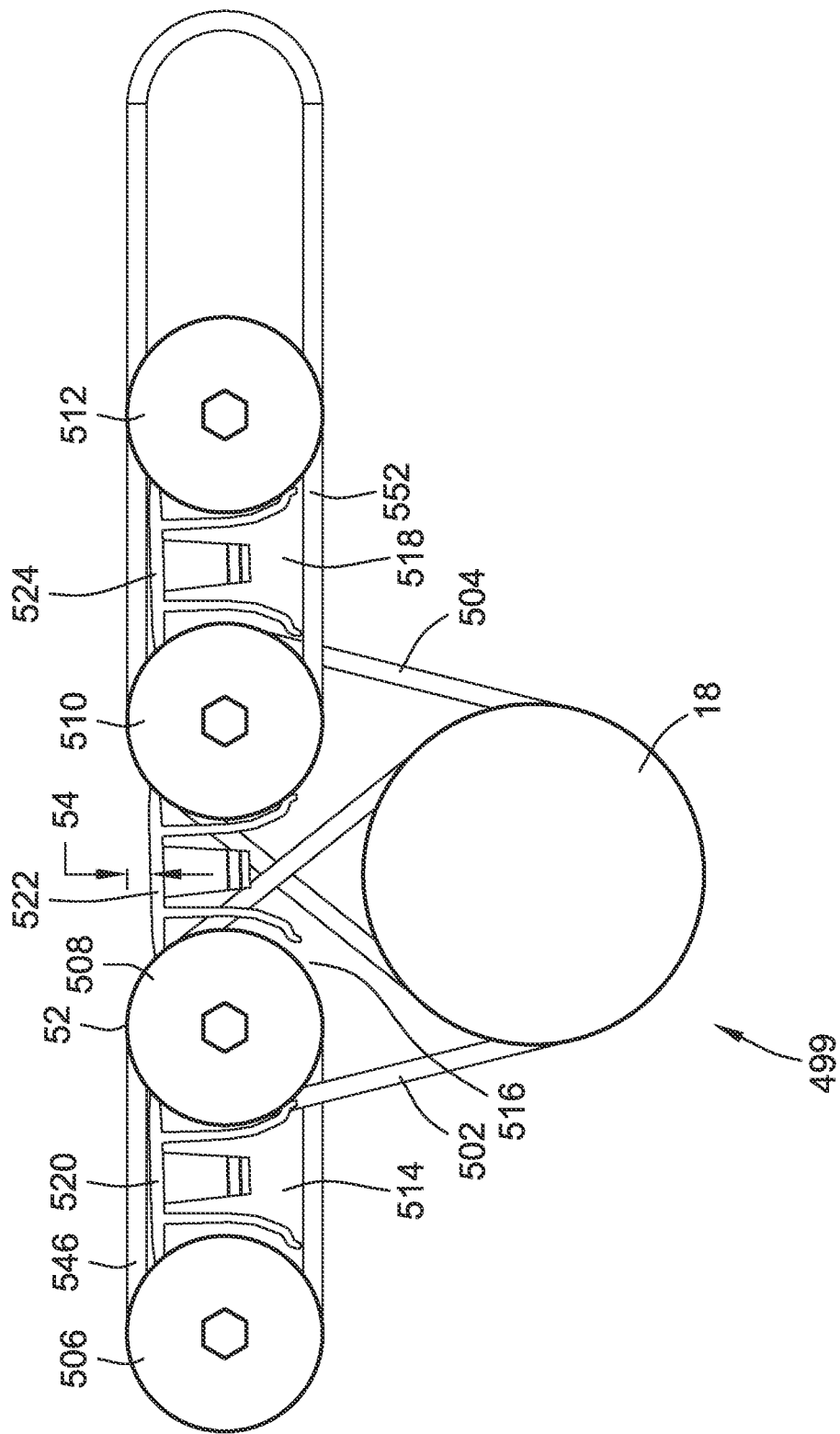
FIG. 12 is a side elevational view of a drive assembly of the roller conveyor of FIG. 1 showing two drive o-rings extending from the drive pulley to two of the adjacent rollers.
Figure 13:
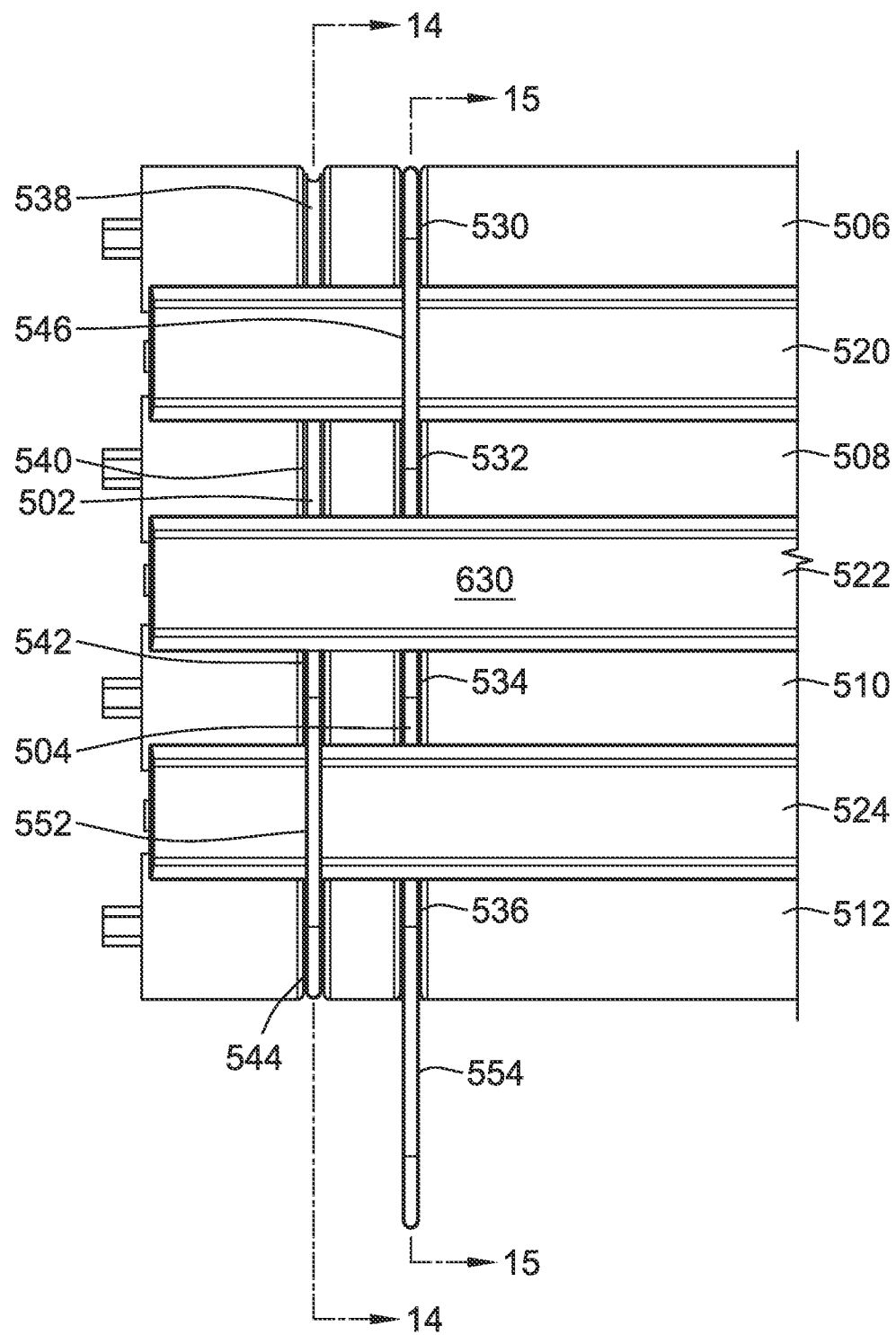
FIG. 13 is a top plan view of the rollers of FIG. 12 showing upper portions of the two drive o-rings engaged with two of the rollers and a central gap blocker longitudinally intermediate the two rollers having an upper surface free of drive o-rings extending thereacross.

Regarding FIGS. 12 and 13, a drive assembly 499 of the roller conveyor 10 is shown that includes the drive pulley 18, rollers 506, 508, 510, 512, and o-rings 546, 502, 504, 552, 554. The o-rings of the roller conveyor 10 are sized so that when put in the respective grooves of the rollers and drive pulleys 18, the o-rings will be frictionally engaged so that rotation of a drive pulley 18 or an upstream roller causes rotation of the driven roller, whether directly by the drive pulley or directly by an upstream roller that is directly driven by the drive pulley. The rollers 506, 508, 510, 512 have laterally inner annular grooves 530, 532, 534, 536 and laterally outer annular grooves 538, 540, 542, 544 that receive the o-rings 546, 502, 504, 552, 554 in a laterally alternating arrangement. The gap blocker 522 has an upper surface 630 that is not crossed by a o-ring thereabove since the adjacent o-rings 502, 504 are directed below the gap blocker 522 toward the drive pulley 18 below the level of the rollers 506-512.

The rollers 506, 508, 510, 512 are separated by gaps 514, 516, 518 so that the rollers 506-512 are spaced from each other in the longitudinal, travel direction. The conveyor system 10 includes gap blockers 520, 522, 524 in the gaps 514, 516, 518 to keep objects from falling through the gaps 514, 516, 518. Rotation of the drive pulley 18 causes the o-rings 502, 504 to travel around the pulley 18 and rollers 508, 510 with the friction between the o-rings 502, 504 and the rollers 508, 510 causing rotation of the rollers 508, 510. The rollers 506, 512 are connected to the rollers 508, 510 via o-rings 546, 552 such that the rotation of the rollers 508, 510 caused by rotation of the drive pulley 18 causes similar rotation of the rollers 506, 512. The gap blockers 520, 522, 524 remain generally stationary in the gaps 514, 514, 516 as the rollers 506, 508, 510, 512 rotate.

Figure 14:
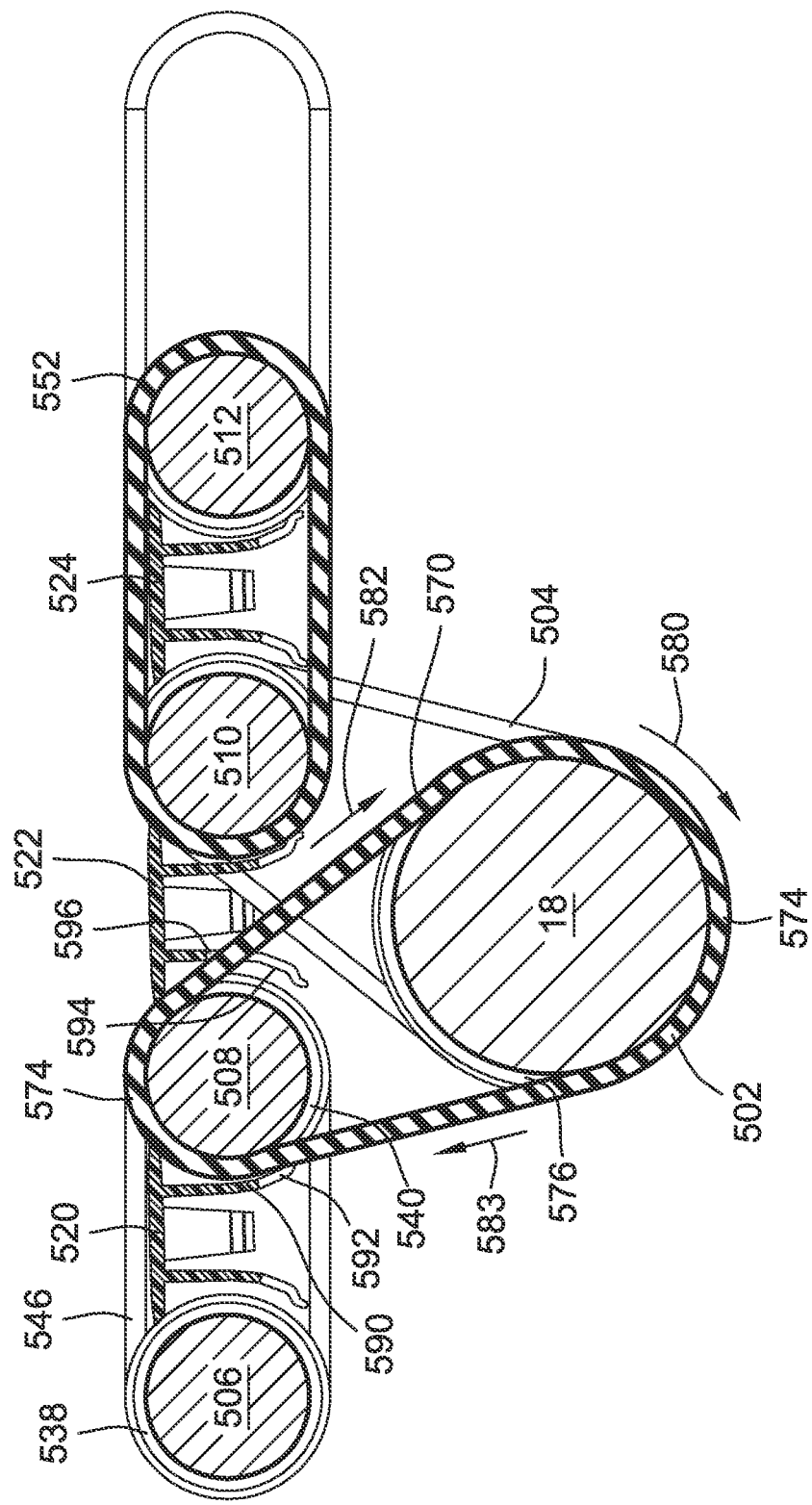
FIG. 14 is a cross-sectional view taken across line 14-14 in FIG. 13 showing one of the two o-rings extending through the lateral space between upstream legs of the central gap blocker.

Referring to FIG. 14, the o-ring 502 includes a downstream run 570, upstream run 572, a curved portion 574 in groove 540 of roller 508 and a curved portion 574 in groove 576 of the drive pulley 18. Rotation of the drive pulley 18 in rotary direction 580 causes the o-ring 502 to travel around the pulley 18 and roller 508 so that the downstream run 570 travels in direction 582 toward the groove 576 of the drive pulley 18 and the upstream run 572 travels in direction 583 into the groove 540 of the roller 508. The gap blocker 520 has downstream legs 590 and a lateral space 592 between the downstream legs 590. The lateral space 592 provides clearance for the upstream run 572 to extend between the downstream legs 590. Similarly, the gap blocker 522 has upstream legs 594 and a lateral space 596 between the upstream legs 594. The lateral space 596 provides clearance for the downstream run 570 of the o-ring 502 to extend from the roller 508 to the drive pulley 18.

Figure 15:
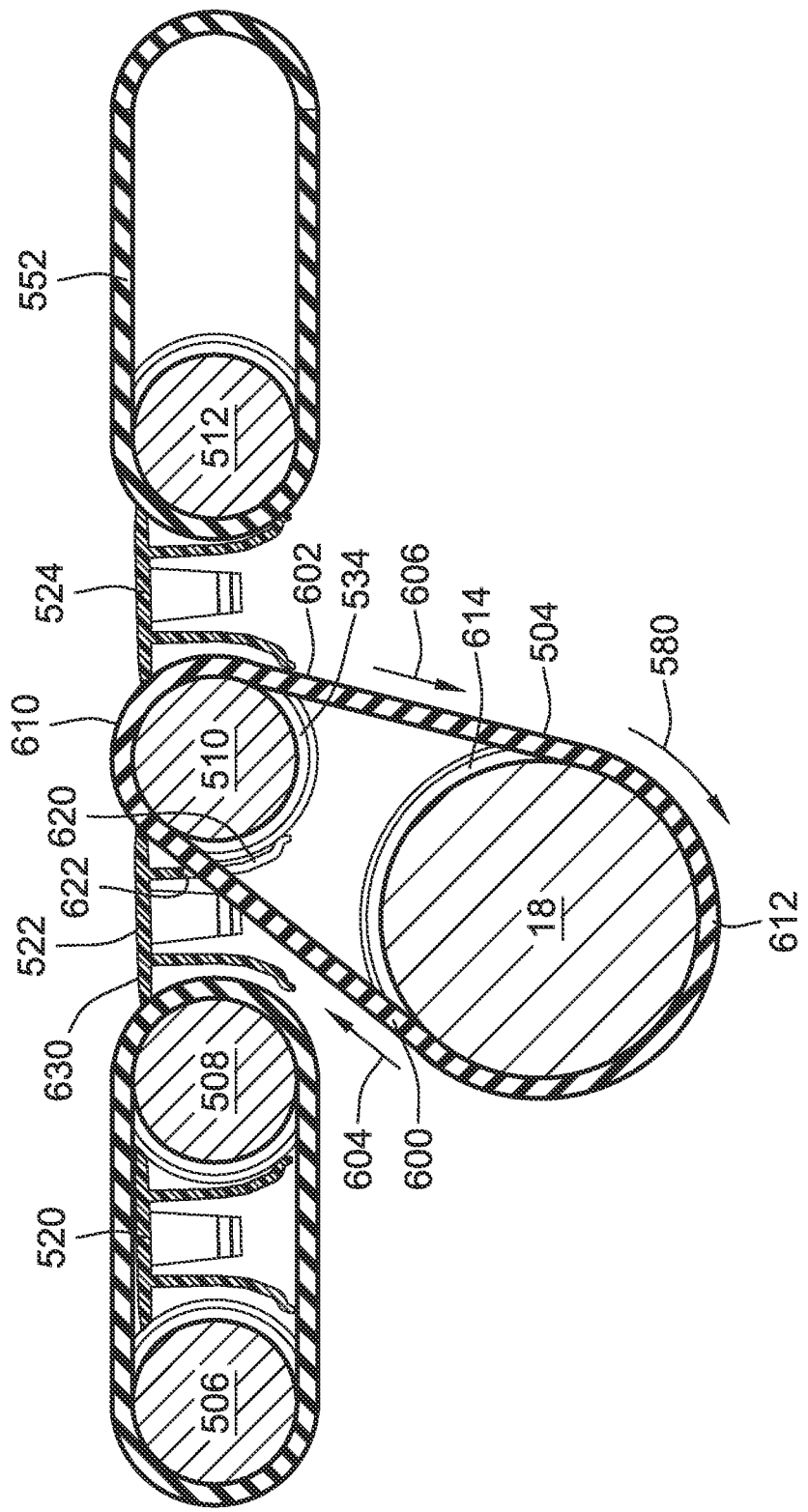
FIG. 15 is a cross-sectional view taken across line 15-15 in FIG. 13 showing the other of the two o-rings extending through a lateral space between downstream legs of the central gap blocker.

Referring to FIG. 15, the o-ring 504 includes upstream and downstream runs 600, 602 that travel respectively in rotary directions 604, 606 upon rotation of the drive pulley 18 in direction 580. The o-ring 504 has a curved portion 610 received in the inner groove 534 of the roller 510 and a curved portion 612 received in a groove 614 of the drive pulley 18. The gap blocker 522 has a lateral space 622 between downstream legs 620 to permit the upper run 600 of the o-ring 504 to extend through the lateral gap 622 of the gap blocker 522 without contacting the downstream legs 620.

With reference to FIGS. 14 and 15, the lateral gap 596 between the upstream legs 594 and the lateral gap 622 between the downstream legs 620 provide clearance for the o-rings 502, 504 to travel and transfer rotation from the drive pulley 18 to the rollers 508, 510. The gap blocker 522, which is similar to the other gap blockers of the roller conveyor 10, may thereby be installed in roller conveyors having complicated arrangements of o-rings without interfering with operation of the o-rings.

Figure 16:
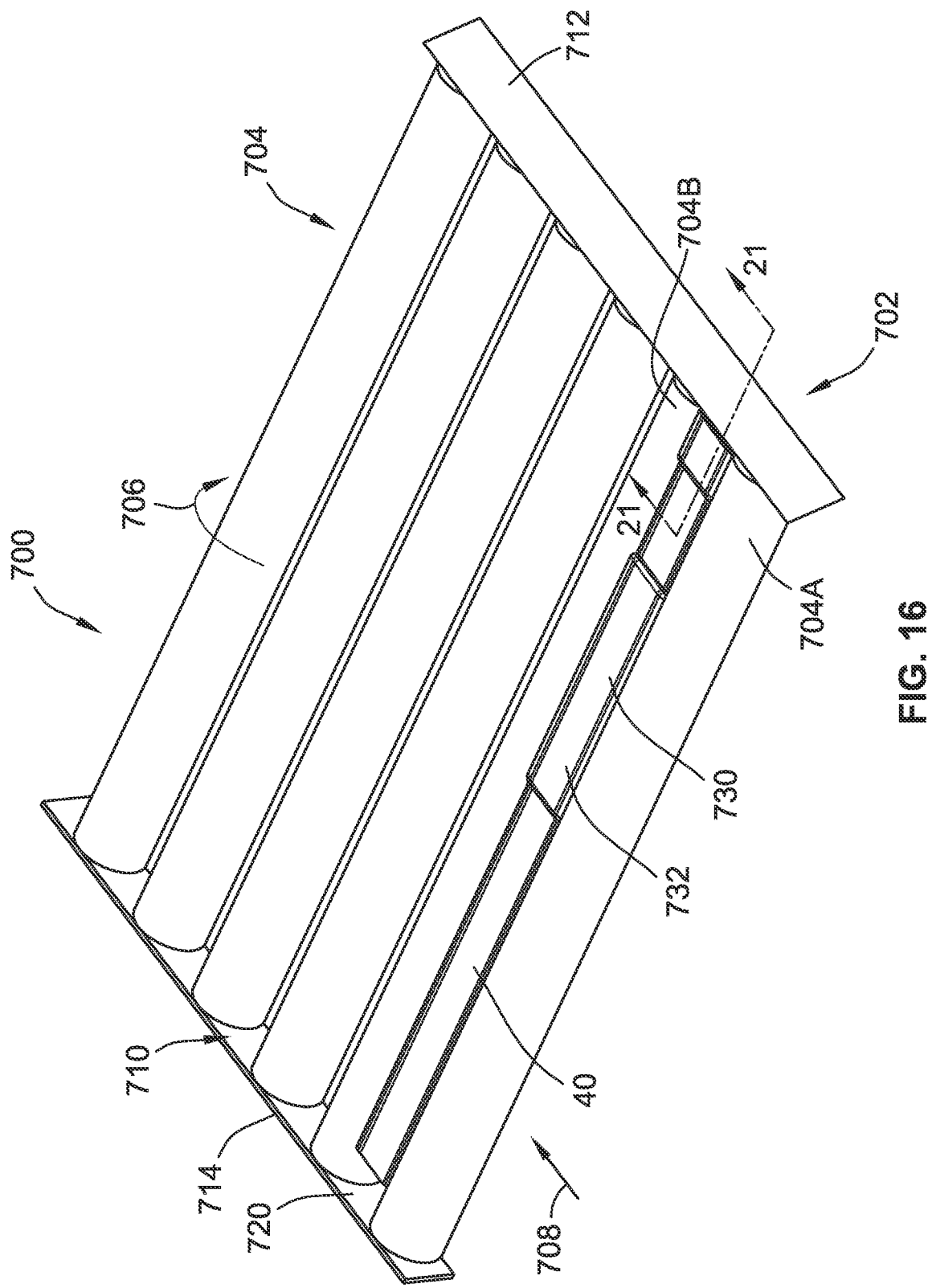
FIG. 16 is a perspective view of a roller conveyor having rollers and gap blockers in a gap between two adjacent rollers of the roller conveyor.

Referring to FIG. 16, a roller conveyor 700 is provided that includes a conveyor frame 702 rotatably supporting rollers 704 that are rotatable in direction 706 to convey an object in a downstream longitudinal direction 708. Although the rollers 704 are rotatable, the rollers 704 are fixed against movement in the longitudinal direction 708 via bearing connections with the conveyor frame 702. The rollers 704 may be driven by a drive band in contact with an underside of the rollers 704 or may be rotated by an object as gravity moves the object along the roller conveyor 700. In another embodiment, the rollers 704 may have grooves to receive o-rings for driving the rollers 704 in a manner similar to roller conveyors discussed above.

The roller conveyor 700 has gaps 710 between the rollers 704. The conveyor frame 702 includes skirts or side walls 712, 714 laterally outward from the rollers 704 that extend longitudinally along the roller conveyor 700. In some embodiments, the side walls 712, 714 extend upward beyond the rollers 704 to keep conveyed objects traveling in the downstream longitudinal direction 708 on the roller conveyor 700 and inhibit the conveyed objects from falling off of the roller conveyor 700 in either lateral direction.

As illustrated, the gaps 710 include a gap 720 having the gap blocker 40 and a gap blocker 730 positioned therein. The gap blocker 730 is similar in many respects to the gap blocker 40 discussed above. It will be appreciated that the other gaps 710 may include one or more gap blockers as discussed above.

Figure 17:
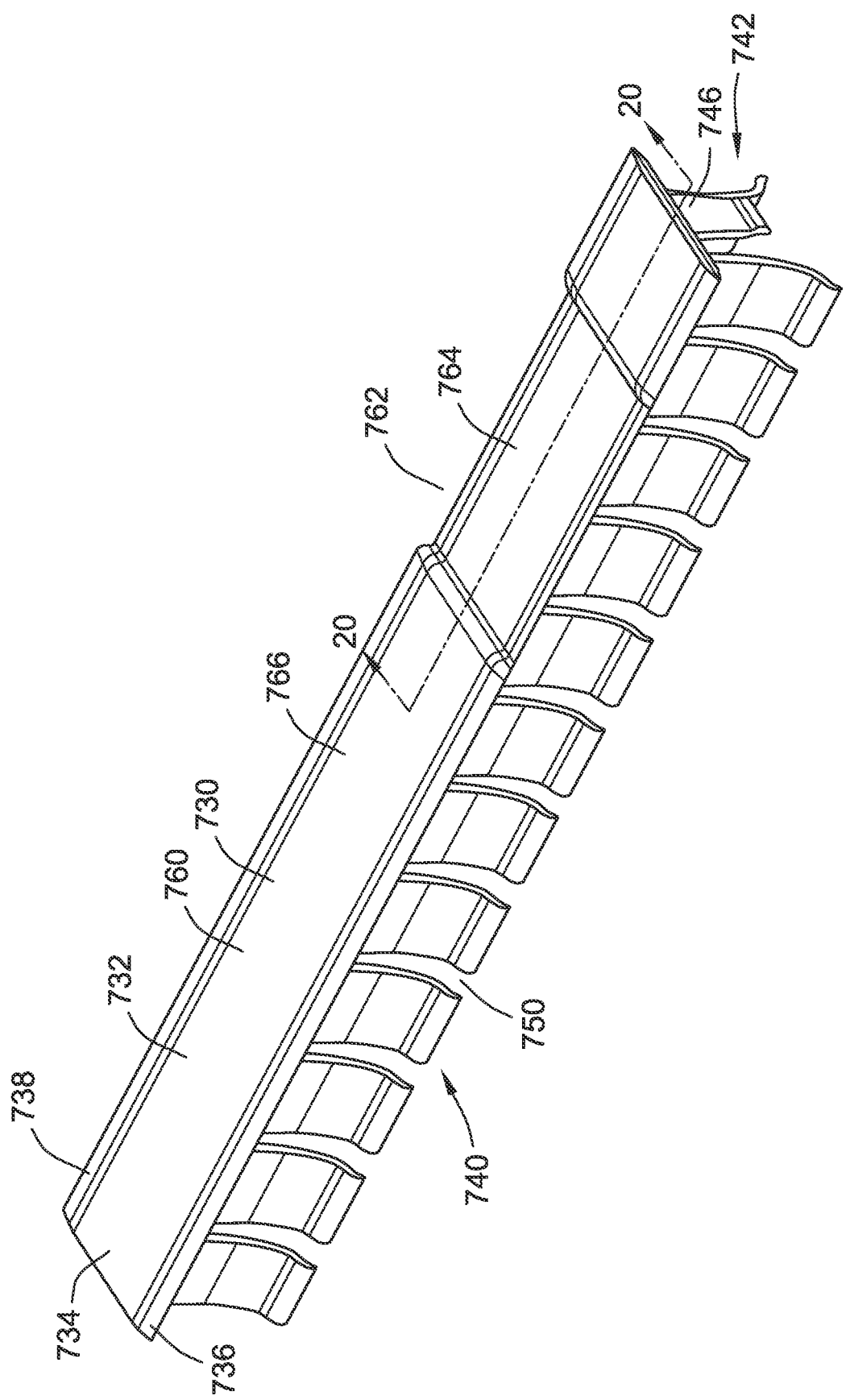
FIG. 17 is a top perspective view of one of the gap blockers of FIG. 16 showing an upper surface of the gap blocker having a wide recessed channel to provide clearance for a portion of a drive member to extend across the upper surface of the gap blocker.
Figure 18:
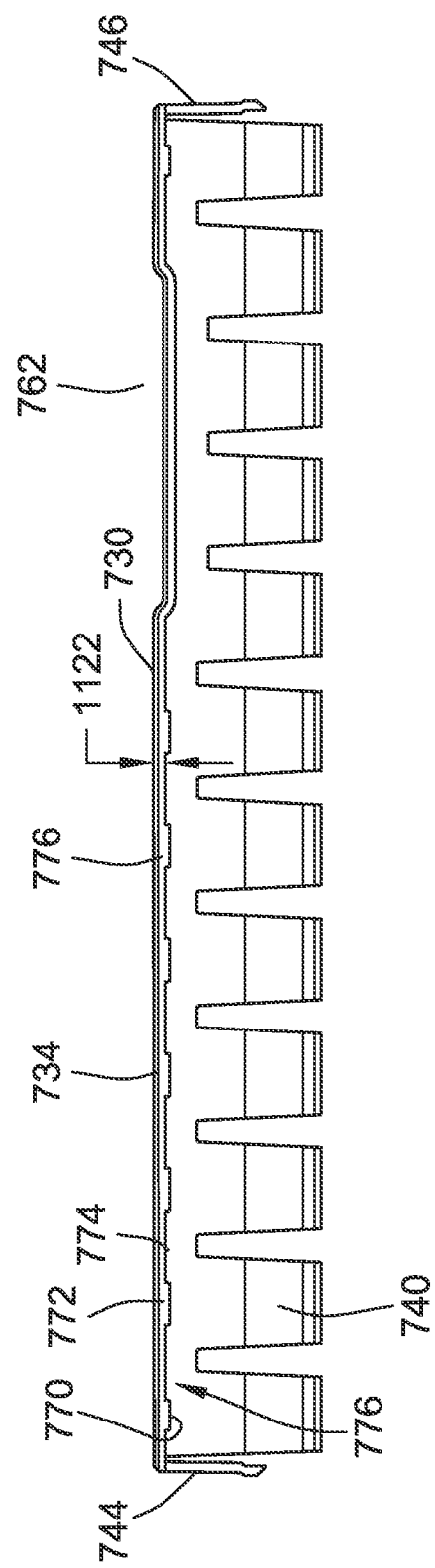
FIG. 18 is an elevational view of the gap blocker of FIG. 17 showing resilient arm portions at opposite lateral sides of the gap blocker.

Regarding FIGS. 16 and 17, the gap blocker 730 has a body 732 configured to be supported in the gap 720 via sliding contact between the body 732 and the associated rollers 704A, 704B. Regarding FIG. 17, the body 732 of the gap blocker 730 has an upper portion, such as a blocking portion 734, sized to be positioned in the gap 720 above a narrowest portion of the gap 720 as measured in the downstream longitudinal direction 708 and keep objects from falling between the rollers 704A, 704B. The blocking portion 734 includes upstream and downstream contact portions 736, 738 configured to form sliding contact with the rollers 704A, 704B above the narrowest portion of the gap 720 and support the gap blocker 730 in the gap 720 during operation of the roller conveyor 700. The body 732 further includes resilient upstream leg portions 740, resilient downstream leg portions 742, and resilient arm portions 744, 746 as shown in FIGS. 17 and 18. The gap blocker 730 has lateral spacings, such as downwardly, open ended slots 750, 752, between the upstream and downstream leg portions 740, 742. The upstream and downstream leg portions 740, 742 are each laterally spaced from the laterally adjacent leg portion(s) throughout the entire length of the leg portion 740, 742. The lateral spacings between the upstream and downstream leg portions 740, 742 permit the leg portions 740, 742 to shift independently of one another so each can accommodate local deviations in the outer surfaces of the rollers 704A, 704B.

With reference to FIG. 17, the gap blocker 730 has an upper surface 760 with a wide recess 762 for being positioned below a portion of the drive member to provide clearance for the portion of the drive member in a roller conveyor that utilizes a drive member to rotate the rollers 704A, 704B. For example, the vertical position of the upper runs of o-rings used to rotate rollers may vary from conveyor system to conveyor system, as well within a given conveyor system due to variation in dimensions of the components of the conveyor system. The recess 762 provides a floor or recessed surface portion 764 below an uppermost surface portion 766 of the upper surface 760 to accommodate the variation in positioning of the drive member.

Referring to FIG. 18, the blocking portion 734 has a lower surface 770 with alternating longitudinal ribs 772 and recesses 774 extending laterally therebetween. The alternating longitudinal ribs and lateral recesses 774 form a crenulated inclined lower contact surface 776 with thinner and thicker sections of the upstream contact portion 736 for contacting the upstream roller 704A. The downstream contact portion 738 of the gap blocker 730 has a similar configuration. The alternating lateral recesses 774 and longitudinal ribs 772 reduce the contact area between the gap blocker 730 and the rollers 704 which reduces friction between the gap blocker 730 and rollers 704A, 704B by breaking up the inclined lower contact surface 776 into thinner and thicker sections thereof so that there is not a long, uniformly thick surface engaged with the rollers 704A, 704B.

Figure 19:
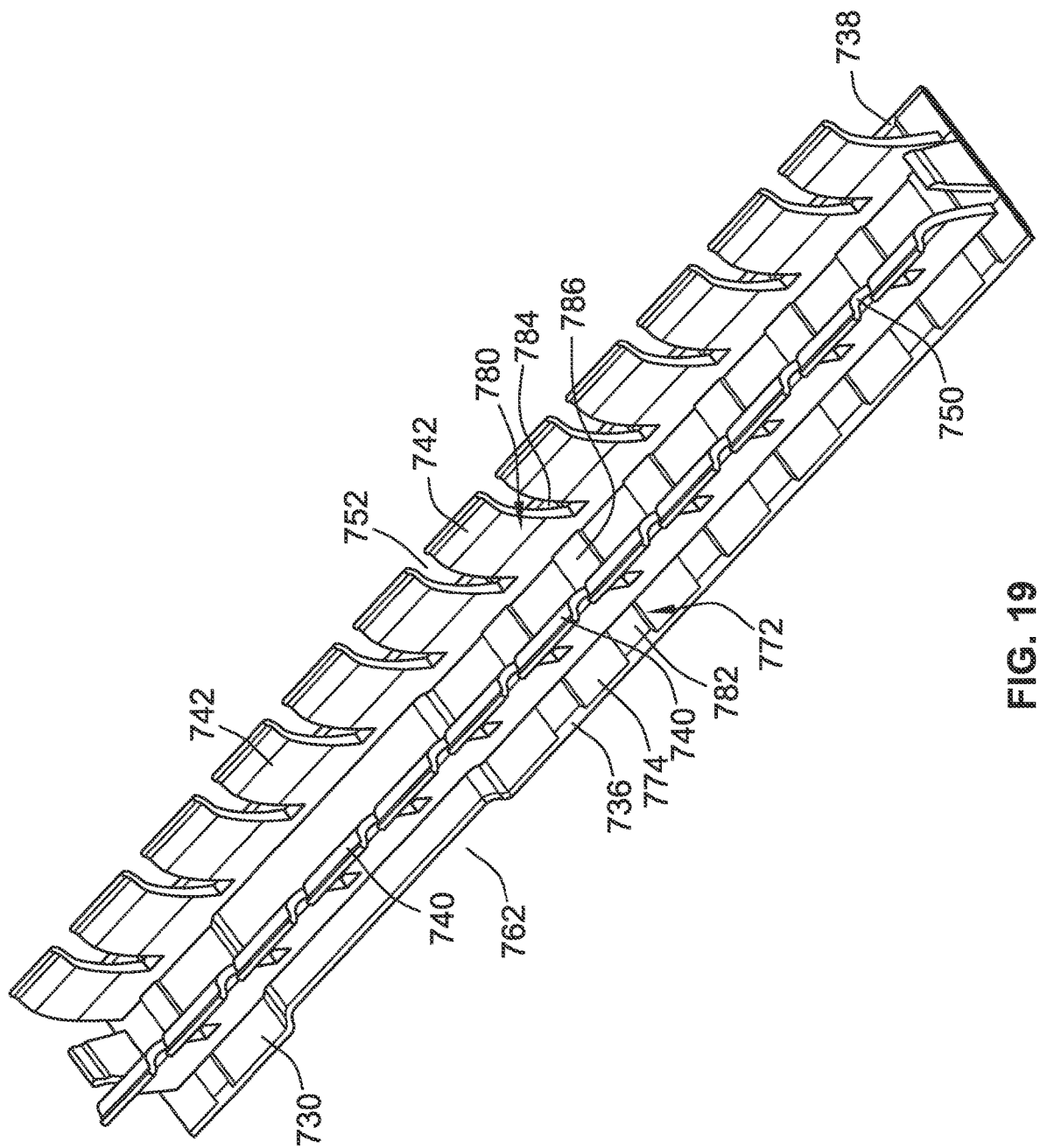
FIG. 19 is a bottom perspective view of the gap blocker of FIG. 17 showing longitudinal ribs of a lower surface of the gap blocker and recesses between the longitudinal ribs.

Referring to FIG. 19, the upstream and downstream leg portions 740, 742 include pairs of longitudinally aligned upstream and downstream leg portions 740, 742 with each pair separated by a longitudinal spacing 780 therebetween. The longitudinal ribs 772 each extend longitudinally from the upstream contact portion 736 to the downstream contact portion 738 with each rib 772 interrupted by a pair of the upstream and downstream leg portions 740, 742 so that the longitudinal ribs 772 each include an upstream rib portion 782, a downstream rib portion 784, and an intermediate rib portion 786. The longitudinal ribs 772 provide increased thickness of the blocking portion 734 at spaced locations along the gap blocker 730 to facilitate the flow of material through a mold used to form the gap blocker 730 during an injection molding process.

Figure 20:
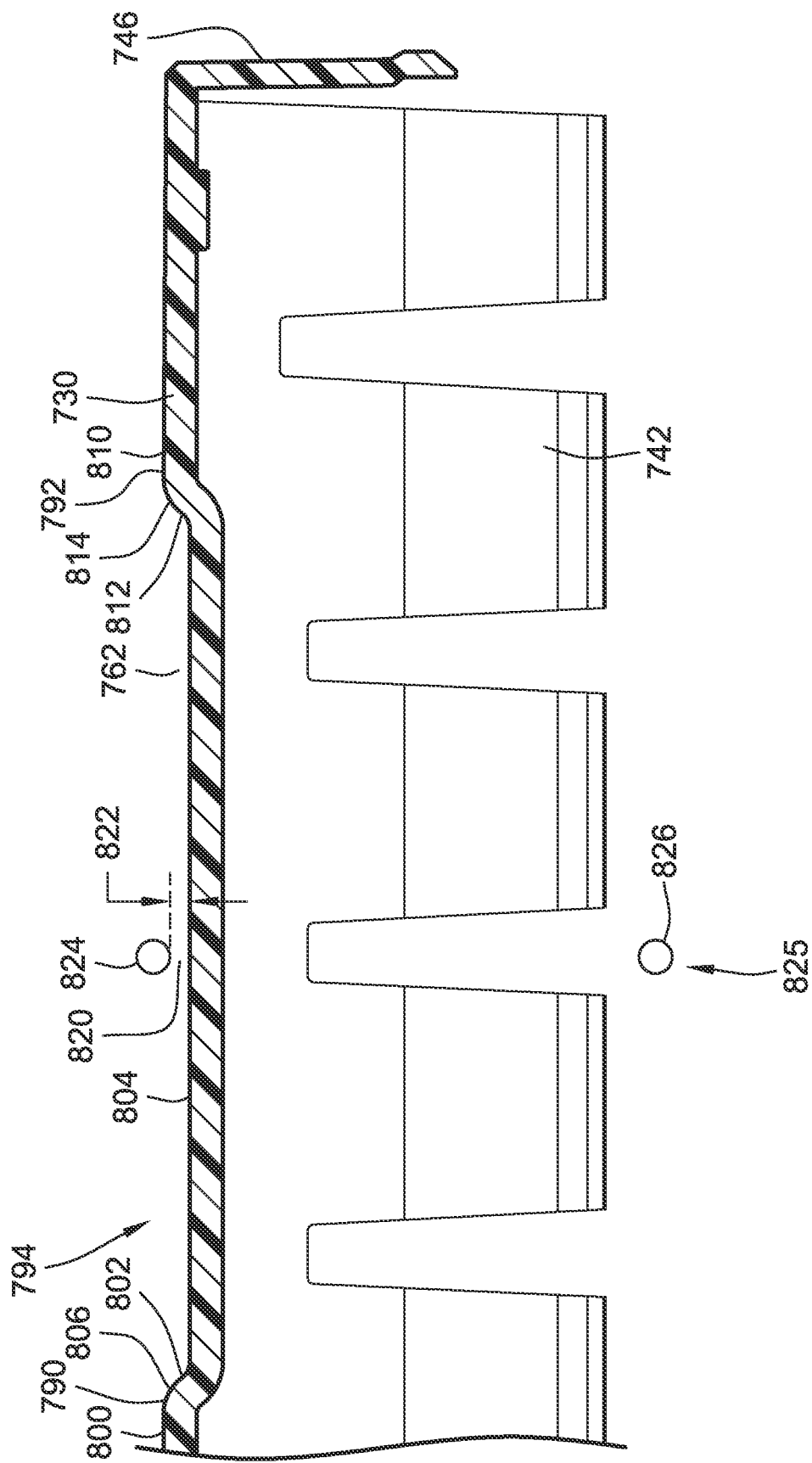
FIG. 20 is a cross-sectional view taken across line 20-20 in FIG. 17 showing the recessed channel in the upper surface of the gap blocker and raised portions of the gap blocker on either side of the recessed channel.

As can be seen in FIG. 20, the gap blocker 730 includes the wide recess 762 and raised portions 790, 792 on opposite sides of the recess 762. The gap blocker 730 has a channel 794 that includes the recess 762. The raised portion 790 includes a generally flat uppermost surface portion 800, a side surface portion 802 of the channel 794 extending upward from a recessed floor surface portion 804 of the channel 794, and a juncture 806 between the flat uppermost surface portion 800 and the side surface portion 802. Similarly, the raised portion 792 includes a flat uppermost surface portion 810, a side surface portion 812 of the channel 794, and a juncture 814 therebetween. If the gap blocker 730 is utilized in a roller conveyor with an upper run 824 of an o-ring 825, the floor surface portion 804 of the channel 794 provides a vertical spacing 820 having a distance 822 between a lower portion of the upper run 824 of the o-ring 825 and the floor surface portion 804 of the channel 794. The spacing 820 provides room to accommodate a temporary downward shifting of the upper run 824 such as if a conveyed object contacts the upper run 824. The drive member 825 may include a lower run 826 that extends below the upstream and downstream leg portions 740, 742 of the gap blocker 730 with the upper and lower runs 824, 826 interconnected by arcuate portions extending in grooves about the rollers.

Figure 21:
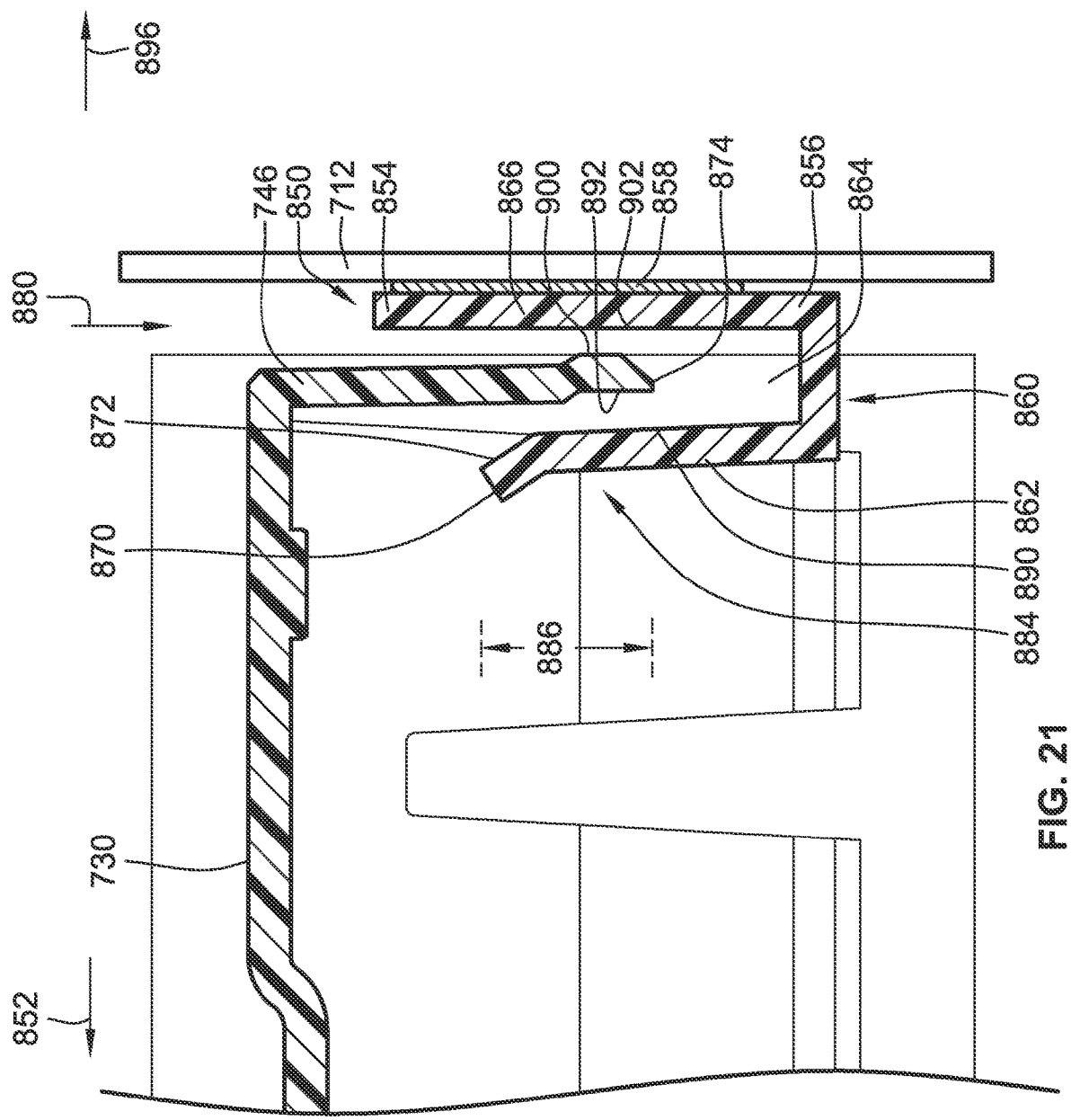
FIG. 21 is a cross-sectional view taken across line 21-21 in FIG. 16 showing one of the resilient arm portions of the gap blocker received in a retainer that restrains the gap blocker from shifting laterally away from the side wall of the roller conveyor.
Figure 22:
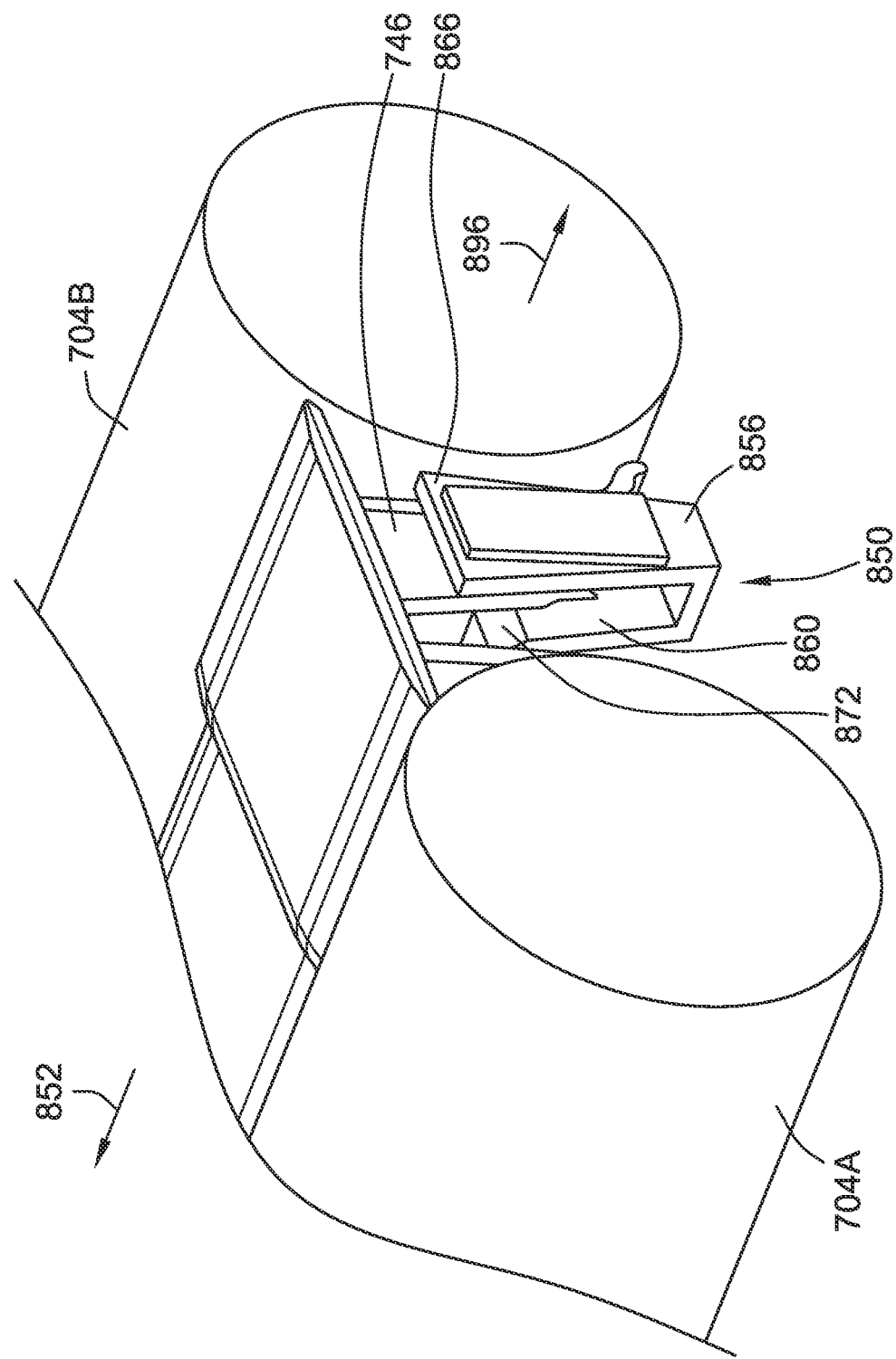
FIG. 22 is a perspective view of the gap blocker and retainer of FIG. 16 with the side wall removed to show an adhesive pad of the retainer that connects the retainer to the side wall.

Referring next to FIGS. 21 and 22, a retainer 850 is shown that may be utilized to keep one lateral side of the gap blocker 730 adjacent to the side wall 712 or other conveyor structure to inhibit movement of the gap blocker 730 in a lateral direction 852 away from the side wall 712 or other structure. The gap blocker 730 intermittently contacts the retainer 850 as the gap blocker 730 shifts slightly side-to-side in lateral directions 852, 896 during operation of the roller conveyor. The gap blocker 730 keeps the gap blocker 730 from shifting beyond a predetermined lateral distance from the side wall 712. In other words, the retainer 850 permits the gap blocker 730 to float in the gap 720 but limits the lateral movement of the gap blocker 730 in the gap 720. For example, the retainer 850 may be used to keep the gap blocker 730 at a position where the recess 762 is below an upper run of an o-ring. As another example, there may be only one gap blocker 730 in a gap between rollers driven by an o-ring, and the retainer 850 may be used to keep the gap blocker 730 between the upper and lower runs of the o-ring to protect the o-ring from being damaged by an object. For example, the presence of the gap blocker 730 below the upper run of the o-ring positions the gap blocker to inhibit the upper run from being deflected downwardly too far upon an object contacting the upper run. In some applications where a more secure connection may be desired, the retainer 850 may be configured so that the gap blocker 730 continuously contacts or is affixed to the retainer 850 during roller conveyor operation.

In the illustrated form, the retainer 850 includes a mounting bracket 854 having a body 856 and an attachment member such as an adhesive pad 858 for securing the body 856 to the side wall 712. The attachment member may include one or more attachment members such as fasteners, a weld, or chemical bonding. In one embodiment, the mounting bracket 854 has openings for receiving fasteners such as bolts or screws to secure the mounting bracket 854 to the side wall 712.

The body 856 has a receptacle 860 sized and configured to receive a portion of the gap blocker 730 such as the resilient arm portion 746. As shown, the receptacle 860 can include a gap blocker engaging portion such as an arm portion 862 to engage the gap blocker 730 and limit movement thereof. The arm portion 862 is spaced by a gap 864 from a base portion 866 of the body 856. The arm portion 862 includes an inclined upper end portion 870 having a tapered lead-in surface 872 thereon to direct a lower end portion 874 of the resilient arm portion 746 into the gap 864 as the gap blocker 730 is advanced downward in direction 880 into the gap 720. The tapered lead-in surface 872 is inclined to extend downwardly and laterally outward from its upper end to its lower end. Both arm portion 862 and arm portion 746 are formed so they can resiliently deflect as may be necessary as the arm portion 746 is inserted into the receptacle 860.

The retainer 850 includes a stop portion 884 to inhibit or restrain the gap blocker 730 from moving in lateral direction 852. In the illustrated form, the stop portion 884 is the section of the arm portion 862 that vertically overlaps the resilient arm portion 746 of the gap blocker 730 to be in interference therewith in the lateral direction 852. For example, the arm portion 862 of the retainer 850 overlaps the resilient arm portion 746 of the gap blocker 730 by a distance 886. The distance 886 is selected so that the arm portion 862 can accommodate variations in the mounting of the retainer 850 as well as the position of the gap blocker 730 in the gap 720 while still including an overlapping section of the arm portion 862 forming the stop portion 884 thereof.

The arm portion 862 of the retainer 850 has a surface portion 890 for engaging a facing surface portion 892 of the resilient arm portion 746 of the gap blocker 730 to be in position to resist movement of the gap blocker 730 in the lateral direction 852. The illustrated retainer 850 can also include the base portion 866 for being secured to the side wall 712 and cooperating with the arm portion 862 to form the pocket or receptacle 860 therebetween. The lower end portion 874 of the resilient arm portion 746 and the base portion 866 have confronting vertically extending flat surface portions 900, 902 that are configured to engage to stop movement of the gap blocker 730 in lateral direction 896.

As can be seen in FIG. 22, the resilient arm portion 746 of the gap blocker 730 is received within the receptacle 860 of the retainer 850. The base portion 866 of the body 856 has a lateral extent that is sized so that when the retainer 850 is mounted to the skirt 712, the retainer 850 will fit in the space between the skirt wall 712 and the rollers and will not interfere with rotation of the rollers 704A, 704B. In another embodiment, the retainer 850 may be a portion of the side wall 712 or other conveyor structure so as to be integrally formed therewith as a unitary structure. As an example, the retainer 850 may include a tab bent out of the plane of side wall 712 that is configured to engage the resilient arm portion 746 of the gap blocker 730 to keep the gap blocker 730 from shifting laterally away from the side wall 712 in a manner similar to the arm portion 862.

Figure 23:
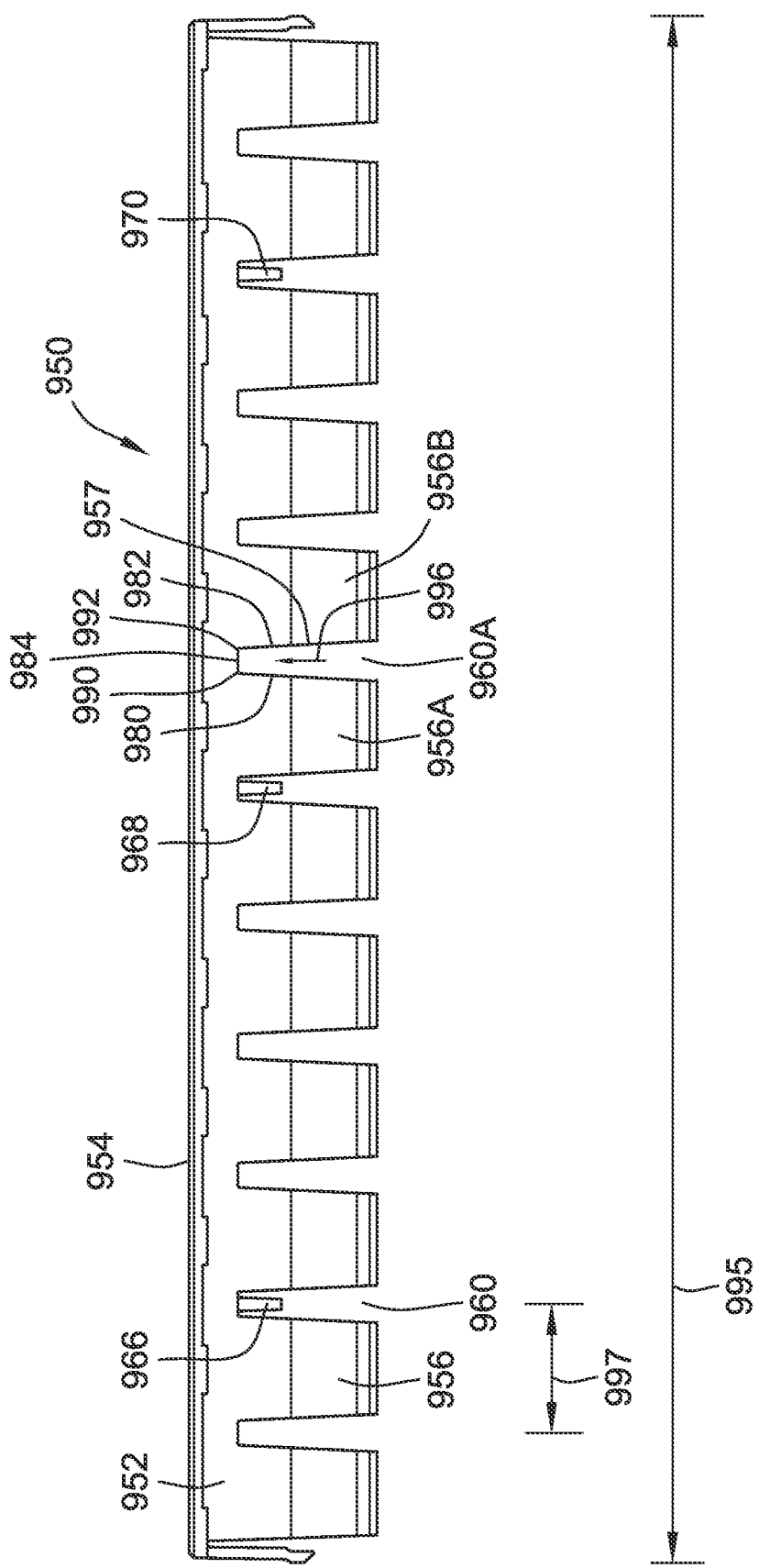
FIG. 23 is a front elevational view of another gap blocker showing laterally spaced leg portions with the lateral spacings each having a closed end with a flat, cutter receiving surface.
Figure 24:
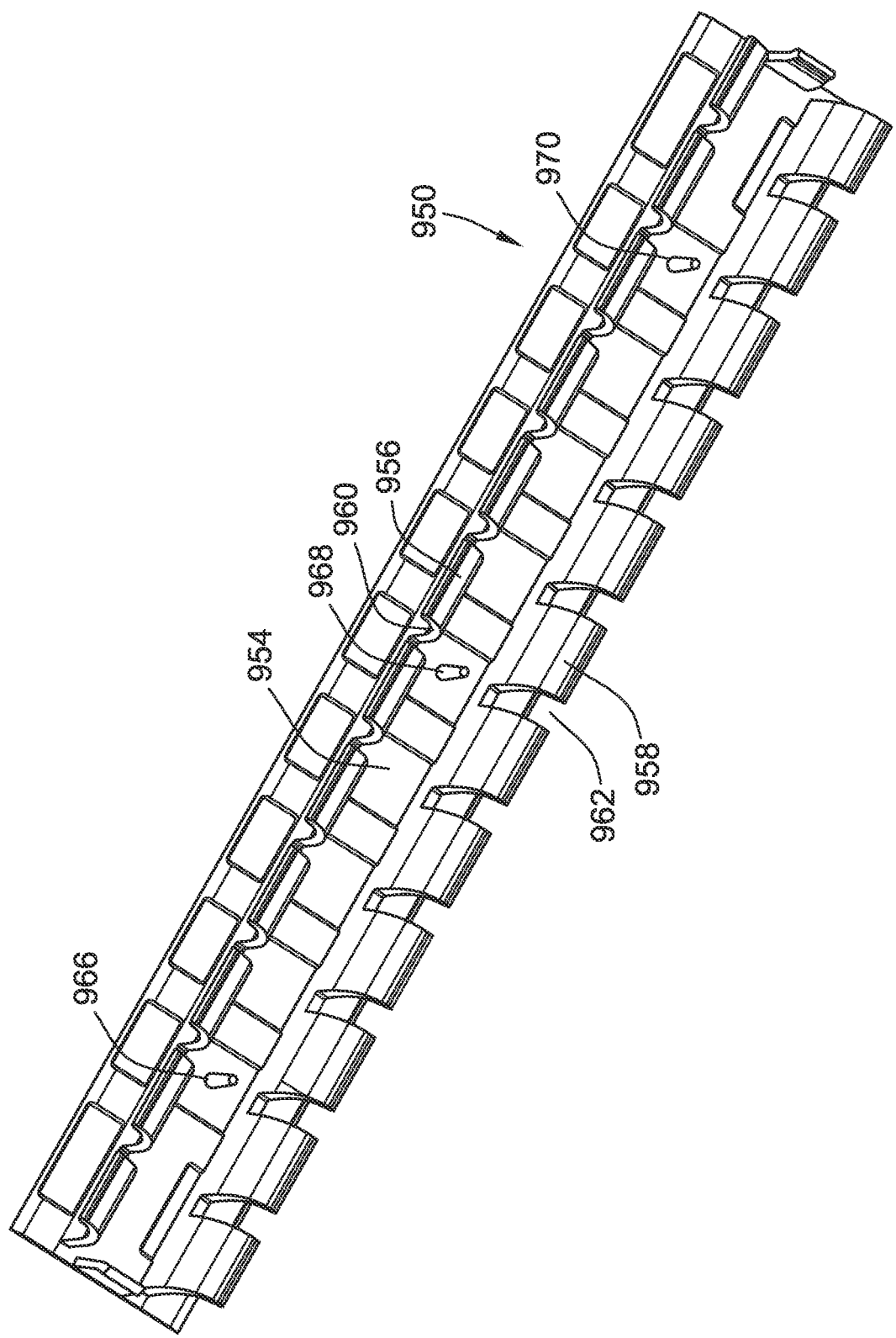
FIG. 24 is a bottom perspective view of the gap blocker of FIG. 23 showing posts protruding from a lower surface of an upper blocking portion of the gap blocker.

Referring to FIG. 23, a gap blocker 950 is provided that is similar in many respects to the gap blockers discussed above. The gap blocker 950 has a body 952 with an upper blocking portion 954 and lower upstream and downstream leg portions 956, 958. The upstream leg portions 956 have lateral spacings 960 therebetween and the downstream leg portions 958 have lateral spacings 962 therebetween. The gap blocker 950 includes one or more bosses or posts 966, 968, 970. The bosses 966, 968, 970 may be remnants from a molding process and reflect the geometry of material passageways into the mold cavity used to form the gap blocker 950.

The upstream leg portions 956A, 956B have flat side surfaces 980, 982 that are connected by a flat end surface 984. The gap blocker 950 has junctures such as corners 990, 992 between the side surfaces 980, 982 and the flat end surface 984. The side surfaces 980, 982 have a slight taper towards each other from their bottom ends to the upper, flat end surface 984 so that the opening at the bottom between the leg portions 956A, 956B is slightly enlarged. In this manner, the lateral spacing 960A forms an open-ended slot 957 with an upper closed end at the flat end surface 984. The enlarged opening at the bottom of the slot 957 allows a cutting tool or cutter to be inserted more easily into the slot 957. The generally flat side surfaces 980, 982 permit a user to slide the cutter, such as a knife blade, in direction 996 along one of the side surfaces 980, 982 and into engagement with one of the corners 990, 992 as part of cutting the gap blocker 950 to a desired length. The relatively sharp corners 990, 992 provided by the intersecting side surfaces 980, 982 and flat end surface 984 provide two locations for a user to readily position the cutter and apply a cutting force against the gap blocker 950 which makes cutting the gap blocker 950 to a desired length easier.

The gap blocker 950 has a repeating pattern of leg portions 956, 958 and lateral spacings 960, 962 to facilitate cutting of the gap blocker 950 to a desired length while preserving the operability of the gap blocker 950. For example, the gap blocker 950 can have an initial overall length 995 of approximately 12 inches. The gap blocker 950 can have a length 997 from the midpoint of one pair of aligned lateral spacings 960, 962 to an adjacent pair of aligned lateral spacings 960, 962 of approximately one inch. The corners 990, 992 of one of the slots are separated by a distance of approximately 0.25 inches. To cut the gap blocker 950 to a desired length, the user decides to longitudinally cut (see reference numeral 166 in FIG. 2) the gap blocker 950 at one of the pairs of aligned lateral spacings 960, 962 and either corner 990 or corner 992 such that the remaining portion of the gap blocker 950 has the desired length.

Figure 25:
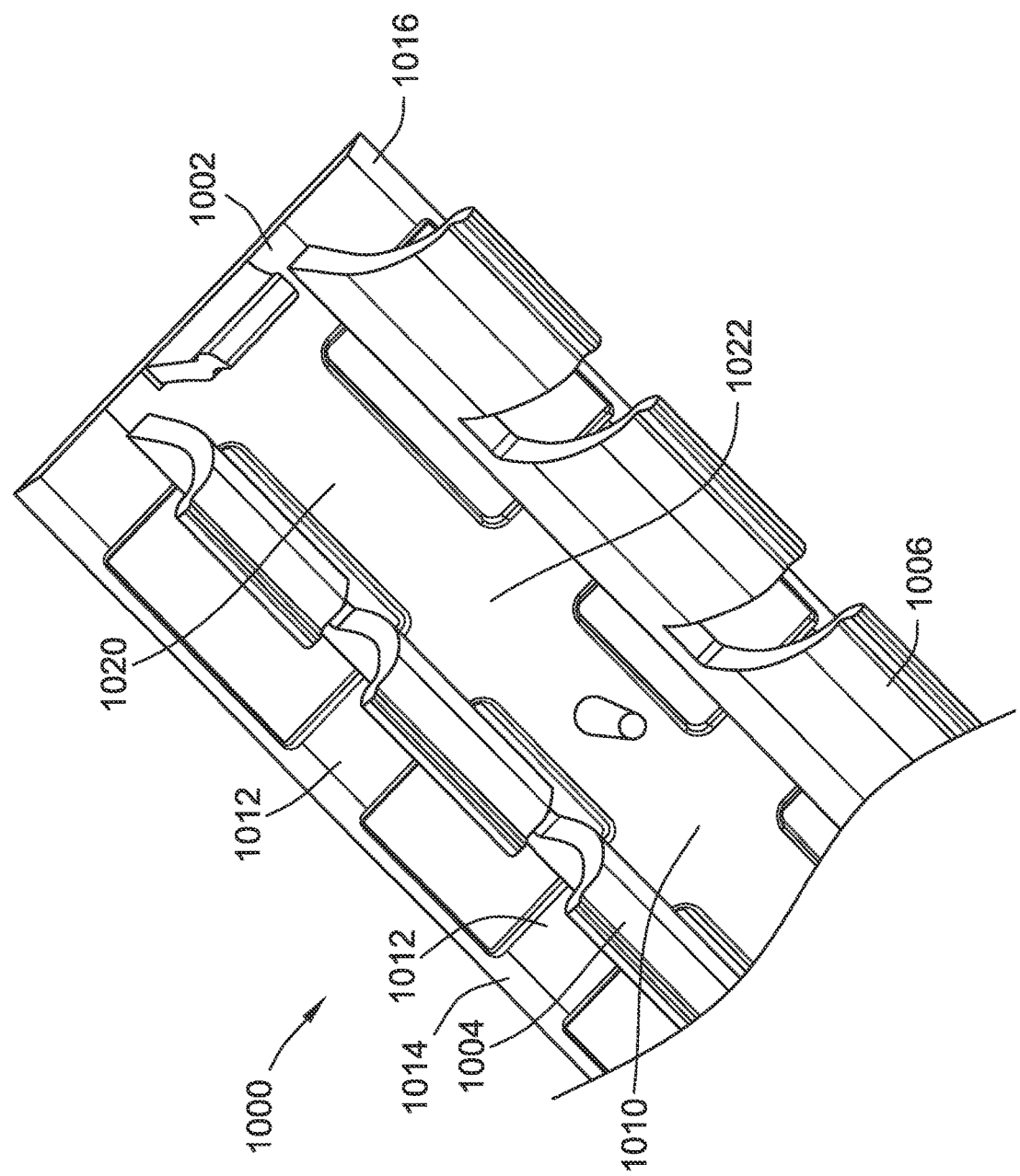
FIG. 25 is a bottom perspective view of another gap blocker showing a lower surface of an upper blocking portion of the gap blocker, the lower surface including longitudinal ribs intersecting a lateral rib.

Regarding FIG. 25, a gap blocker 1000 is shown that is similar in many respects to the gap blockers discussed above. The gap blocker 1000 has a blocking portion 1002 and upstream and downstream leg portions 1004, 1006 depending therefrom. The blocking portion 1002 has a lower surface 1010 that includes longitudinal ribs 1012 extending between upstream and downstream contact portions 1014, 1016. The lower surfaces 1010 further includes a lateral rib 1020 forming junctures 1022 with the longitudinal ribs 1012. The portion of the mold cavity used to form the lateral rib 1020 provides additional cross-sectional area for material to flow in the mold cavity and facilitate precise forming of the gap blocker 1000.

Figure 26:
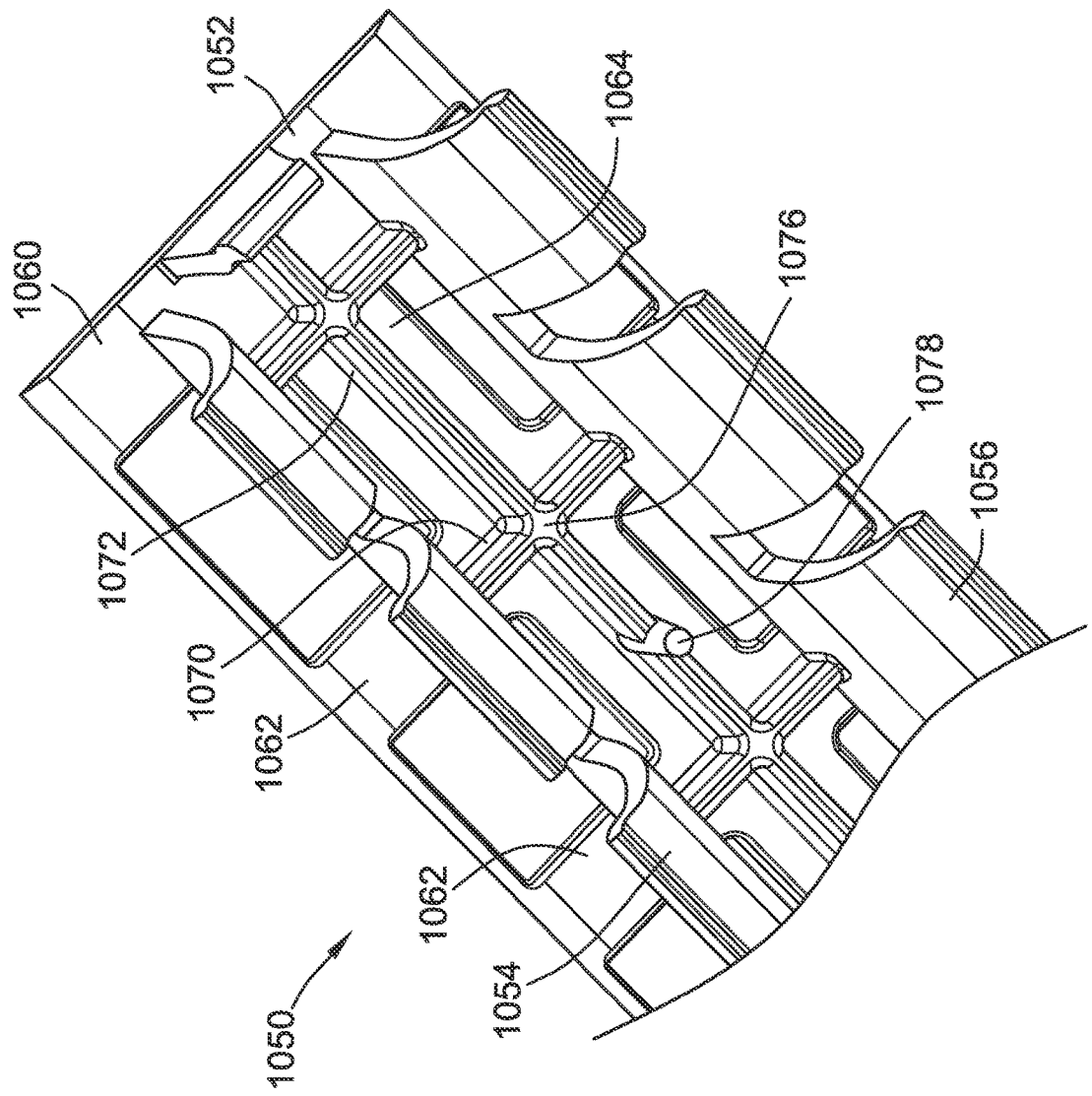
FIG. 26 is a bottom perspective view of another gap blocker showing a lower surface of an upper blocking portion of the gap blocker, the lower surface including raised wall portions and a post.

Regarding FIG. 26, a gap blocker 1050 is shown that is similar in many respects to the gap blockers discussed above. The gap blocker 1050 has a blocking portion 1052, and upstream and downstream leg portions 1054, 1056. The blocking portion 1052 has a lower surface 1060 with longitudinal ribs 1062 that intersect a lateral rib 1064. The gap blocker 1050 further includes longitudinal wall portions 1070 upstanding from the longitudinal ribs 1062 and lateral wall portions 1072 upstanding from the lateral rib 1064. The longitudinal and lateral wall portions 1070, 1072 are connected at junctions 1076. The gap blocker 1050 further includes posts 1078 that project from the lateral wall portions 1072. The portions of the mold cavity that are used to form the longitudinal and lateral wall portions 1070, 1072 provide increased cross-sectional area for material to flow in the mold cavity and facilitate precise forming of the gap blocker 1050.

Figure 27:
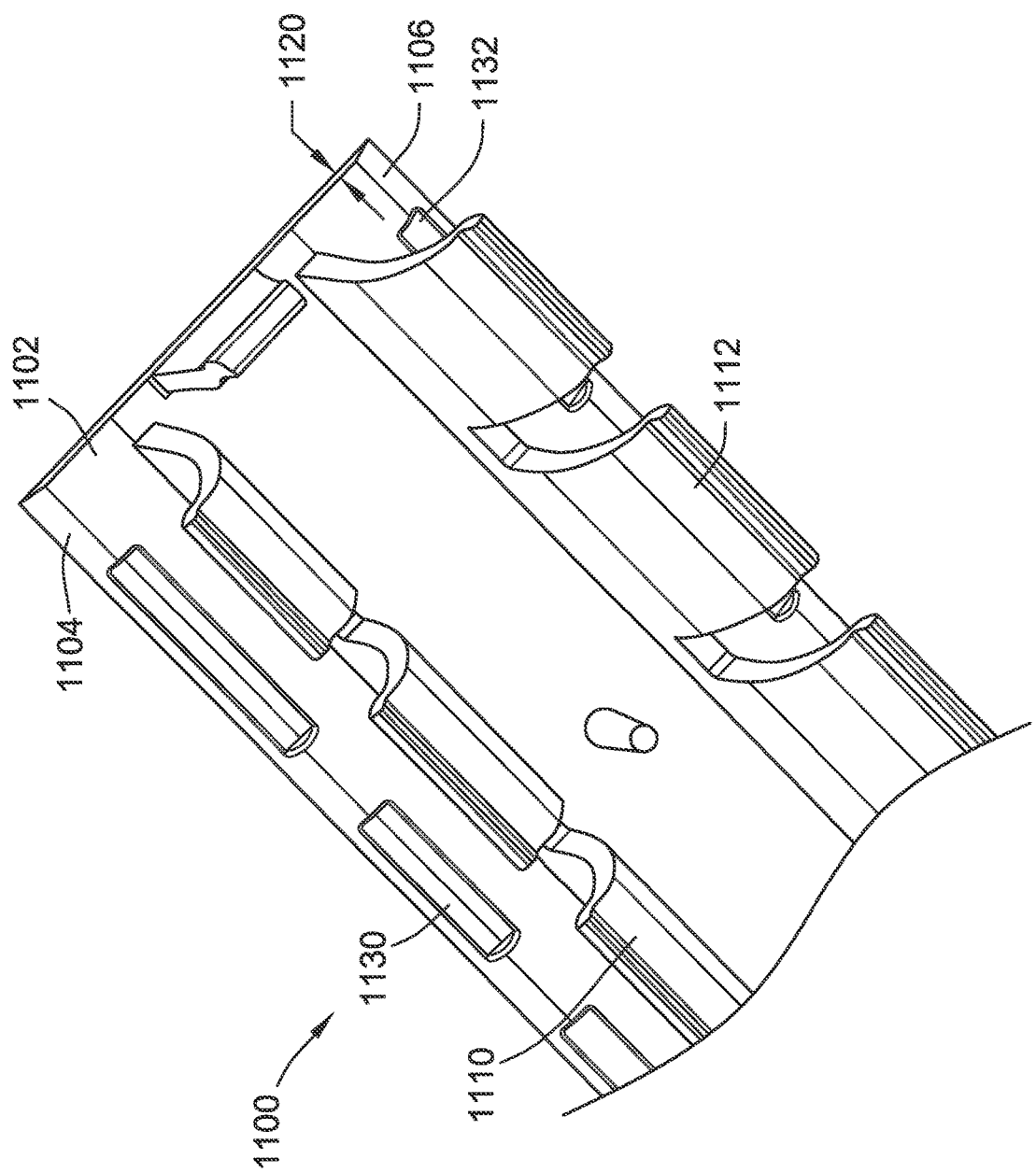
FIG. 27 is a bottom perspective view of another gap blocker showing a gap blocker having a thicker upper blocking portion with a generally flat lower surface without lateral and longitudinal ribs intermediate the legs of the gap blocker.

Regarding FIG. 27, a gap blocker 1100 is provided having a blocking portion 1102 with upstream and downstream contact portions 1104, 1106. The gap blocker 1100 has upstream and downstream leg portions 1110, 1112 depending from the blocking portion 1102. The blocking portion 1102 has a thickness 1120 that is greater than a minimum thickness 1122 (see FIG. 18) of the blocking portions of some of the other gap blockers disclosed herein. The increased thickness 1120 provides a larger cross-sectional area of the portion of the mold cavity that forms the blocking portion 1102 and facilitates flow of material in the mold cavity. The upstream and downstream contact portions 1102, 1106 include recesses 1130, 1132 to reduce contact area with the upstream and downstream rollers as well as reduce noise during roller conveyor operation as discussed above.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A gap blocker for a roller conveyor having upstream and downstream rollers for conveying an object in a downstream longitudinal direction and a gap between the upstream and downstream rollers, the gap blocker comprising:
   a body configured to be supported in the gap by the upstream and downstream rollers as the upstream and downstream rollers rotate during operation of the roller conveyor;
   an upper blocking portion of the body to inhibit the object from falling through the gap;
   upper contact portions of the upper blocking portion for slidingly contacting the upstream and downstream rollers above a narrowest portion of the gap;

a plurality of laterally spaced upstream leg portions of the body connected to the upper blocking portion and having upstream distal end portions to be positioned below the narrowest portion of the gap for keeping the body in the gap;

a plurality of laterally spaced downstream leg portions of the body connected to the upper blocking portion longitudinally spaced from the upstream leg portions so that the upstream and downstream leg portions have a space therebetween extending in a longitudinal direction, the downstream leg portions having downstream distal end portions to be positioned below the narrowest portion of the gap for keeping the body in the gap; and the upstream leg portions of the body configured to be spaced from the upstream roller with the body supported in the gap by the upstream and downstream rollers as the upstream and downstream rollers rotate during operation of the roller conveyor.

2. A gap blocker for a roller conveyor having upstream and downstream rollers for conveying an object in a downstream longitudinal direction and a gap between the upstream and downstream rollers, the gap blocker comprising:

a body configured to be supported in the gap by the upstream and downstream rollers as the upstream and downstream rollers rotate during operation of the roller conveyor;

an upper blocking portion of the body to inhibit the object from falling through the gap;

upper contact portions of the upper blocking portion for slidingly contacting the upstream and downstream rollers above a narrowest portion of the gap;

a plurality of laterally spaced upstream leg portions of the body connected to the upper blocking portion and having upstream distal end portions to be positioned below the narrowest portion of the gap for keeping the body in the gap;

a plurality of laterally spaced downstream leg portions of the body connected to the upper blocking portion longitudinally spaced from the upstream leg portions so that the upstream and downstream leg portions have a space therebetween extending in a longitudinal direction, the downstream leg portions having downstream distal end portions to be positioned below the narrowest portion of the gap for keeping the body in the gap;

wherein the body includes upstream lateral spacings laterally spacing adjacent pairs of the upstream leg portions and downstream lateral spacings laterally spacing adjacent pairs of the downstream leg portions; and wherein the upstream lateral spacings are longitudinally aligned with the downstream lateral spacings to facilitate cutting of the body in a longitudinal direction through an aligned upstream and downstream lateral spacing of the body.

3. The gap blocker of claim 1 wherein the upper contact portions include an upstream contact portion having a plurality of upstream recesses and a downstream contact portion having a plurality of downstream recesses to reduce contact areas between the body and the upstream and downstream rollers.

4. The gap blocker of claim 3 wherein the body includes upstream lateral spacings laterally spacing adjacent pairs of the upstream leg portions and downstream lateral spacings laterally spacing adjacent pairs of the downstream leg portions; and wherein the upstream lateral spacings are longitudinally aligned with the upstream recesses and wherein the downstream lateral spacings are longitudinally aligned with the downstream recesses to facilitate cutting of the body in a longitudinal direction through longitudinally aligned ones of the upstream recesses, downstream recesses, upstream lateral spacings, and downstream lateral spacings.

5. The gap blocker of claim 1 wherein the plurality of upstream leg portions include at least four upstream leg portions; and wherein the plurality of downstream leg portions include at least four downstream leg portions.

6. The gap blocker of claim 1 wherein the longitudinal spacing between the upstream and downstream leg portions extends continuously from the upper blocking portion of the body to the upstream and downstream distal end portions of the upstream and downstream leg portions.

7. The gap blocker of claim 1 wherein the downstream distal end portions of the downstream leg portions are configured to slidingly contact the downstream roller during operation of the roller conveyor.

8. The gap blocker of claim 1 wherein the upstream and downstream leg portions include a plurality of pairs of longitudinally aligned upstream and downstream leg portions.

9. The gap blocker of claim 1 wherein the upstream and downstream leg portions are resilient to permit the leg portions to be deflected as the gap blocker is positioned in the gap.

10. The gap blocker of claim 1 wherein the upstream and downstream leg portions have outer surfaces above the upstream and downstream distal end portions configured to be in clearance with the upstream and downstream rollers with the body supported in the gap by the upstream and downstream rollers.

11. A gap blocker for a roller conveyor having upstream and downstream rollers for conveying an object in a downstream longitudinal direction and a gap between the upstream and downstream rollers, the gap blocker comprising:

a body configured to be supported in the gap by the upstream and downstream rollers as the upstream and downstream rollers rotate during operation of the roller conveyor;

an upper blocking portion of the body to inhibit the object from falling through the gap;

upper contact portions of the upper blocking portion for slidingly contacting the upstream and downstream rollers above a narrowest portion of the gap;

a plurality of laterally spaced upstream leg portions of the body connected to the upper blocking portion and having upstream distal end portions to be positioned below the narrowest portion of the gap for keeping the body in the gap; and a plurality of laterally spaced downstream leg portions of the body connected to the upper blocking portion longitudinally spaced from the upstream leg portions so that the upstream and downstream leg portions have a space therebetween extending in a longitudinal direction, the downstream leg portions having downstream distal end portions to be positioned below the narrowest portion of the gap for keeping the body in the gap;

wherein the body includes upstream open-ended slots laterally spacing the upstream leg portions apart from one another; and wherein the body includes downstream open-ended slots laterally spacing the downstream leg portions apart from one another.

12. The gap blocker of claim 1 wherein the body has opposite lateral side portions extending between the contact portions of the upper blocking portion; and wherein at least one of the lateral side portions of the body includes a resilient biasing member configured to engage an adjacent surface and apply a biasing force in a lateral direction against the adjacent surface.

13. The gap blocker of claim 12 in combination with another gap blocker, the other gap blocker having another resilient biasing member that includes the adjacent surface.

14. The gap blocker of claim 1 wherein the upper blocking portion includes an upper channel to provide clearance for a drive member extending between the upstream and downstream rollers.

15. The gap blocker of claim 1 wherein the upper blocking portion includes an upper surface for spanning across the gap and a lower surface opposite the upper surface; and wherein the lower surface includes a plurality of recesses and transversely extending surface portions associated with each of the recesses.

16. The gap blocker of claim 1 wherein the upstream and downstream leg portions each include an upper end portion connected to a lower surface of the upper blocking portion and a free end opposite the upper end portion, wherein each of the upstream and downstream leg portions are separated from the adjacent upstream and downstream leg portions for the entire extent thereof.

17. The gap blocker of claim 1 wherein the body has a unitary, one-piece construction.

18. The gap blocker of claim 1 wherein the body has a width that extends longitudinally when the body is in the gap and a length perpendicular to the width that extends laterally when the body is in the gap, the length being greater than the width.

19. A gap blocker for being positioned in a gap between upstream and downstream rollers that are rotatable to convey an object in a downstream longitudinal direction across the gap, the gap blocker comprising:

a body to be positioned in the gap;

an upstream contact portion of the body for slidingly contacting the upstream roller;

a downstream contact portion of the body for slidingly contacting the downstream roller;

opposite lateral side portions of the body extending longitudinally intermediate the upstream and downstream contact portions; and a lateral biasing member of one of lateral side portions of the body configured to apply a biasing force in a lateral direction against a surface adjacent to the body and maintain a spacing between the body and the surface during operation of the roller conveyor.

20. The gap blocker of claim 19 further comprising another lateral biasing member of the other one of the lateral side portions, the lateral biasing members are configured to apply first and second biasing forces in opposite lateral directions against surfaces adjacent to the lateral side portions.

21. The gap blocker of claim 19 wherein the lateral biasing member has an initial configuration and a deflected configuration, the lateral biasing member configured to apply the biasing force in the lateral direction in response to the body being positioned in the gap adjacent the surface and the lateral biasing member shifting from the initial configuration to the deflected configuration due to engagement with the surface.

22. The gap blocker of claim 19 wherein the lateral biasing member comprises a resilient arm having a free end portion configured to engage the surface adjacent to the body.

23. The gap blocker of claim 22 wherein the free end portion includes a cam surface to engage another surface and deflect the resilient arm as the gap blocker is positioned in the gap.

24. The gap blocker of claim 23 wherein the cam surface extends transverse to the lateral direction.

25. The gap blocker of claim 19 wherein the lateral biasing member comprises a first resilient arm, the body further comprising a second resilient arm of the other one of the lateral side portions.

26. The gap blocker of claim 19 wherein the body includes an upper blocking portion for extending from the upstream roller to the downstream roller, the upper blocking portion including the upstream and downstream contact portions; and wherein the lateral biasing member depends from the upper blocking portion.

27. The gap blocker of claim 19 wherein the lateral biasing member is longitudinally intermediate the upstream and downstream contact portions along the body.

28. The gap blocker of claim 19 wherein the body includes a upstream leg portion and a downstream leg portion having a longitudinal spacing therebetween; and wherein the lateral biasing member is longitudinally intermediate the upstream and downstream leg portions.

29. The gap blocker of claim 19 wherein the body includes an upper portion having a maximum width larger than a narrowest width of the gap; and wherein the body includes a lower portion with a maximum width larger than narrowest width of the gap.

30. The gap blocker of claim 19 wherein the body includes a plurality of laterally spaced upstream leg portions and a plurality of laterally spaced downstream leg portions, the upstream leg portions and the downstream leg portions having a longitudinal spacing therebetween.

31. A gap blocker system for a roller conveyor having rollers operable to convey an object in a downstream longitudinal direction across a gap between the rollers, the roller conveyor having a conveyor structure adjacent the gap and laterally outward from the rollers, the gap blocker system comprising:

a gap blocker having a unitary, one-piece construction for being positioned in the gap, the gap blocker having contact portions configured to slidingly contact the rollers and support the gap blocker in the gap;

an upper surface of the gap blocker to keep an object from falling through the gap;

opposite lateral side portions of the gap blocker for extending longitudinally in the gap, wherein one of the lateral side portions is configured to be positioned adjacent the conveyor structure when the gap blocker is positioned in the gap; and a retainer configured to keep the one lateral side portion of the gap blocker adjacent the conveyor structure and inhibit lateral movement of the gap blocker away from the conveyor structure during operation of the roller conveyor.

32. The gap blocker system of claim 31 wherein the retainer includes a mounting portion configured to be secured to the conveyor structure and an engaging portion spaced from the mounting portion for engaging the gap blocker.

33. The gap blocker system of claim 31 wherein the gap blocker and the retainer include an engagement projection and recess with the engagement projection configured to extend into the recess.

34. The gap blocker system of claim 33 wherein the retainer includes a receptacle comprising the recess.

35. The gap blocker system of claim 31 wherein the gap blocker and the retainer include portions configured to overlap in a lateral direction to allow the portions to engage and inhibit lateral movement of the gap blocker.

36. The gap blocker system of claim 31 wherein the gap blocker includes a resilient arm; and
wherein the retainer includes an upper, inclined lead-in surface configured to deflect the resilient arm as the gap blocker is lowered into the gap.

37. The gap blocker system of claim 31 in combination with the conveyor structure, the conveyor structure including the retainer.

38. The gap blocker system of claim 31 wherein the gap blocker includes an engaging portion and the retainer includes stop surfaces for receiving the engaging portion of the gap blocker therebetween, the stop surfaces spaced apart to permit a predetermined range of lateral movement of the gap blocker during operation of the roller conveyor.

39. The gap blocker of claim 1 wherein the body includes upstream lateral spacings laterally spacing adjacent pairs of the upstream leg portions and downstream lateral spacings laterally spacing adjacent pairs of the downstream leg portions; and
wherein the upstream lateral spacings are longitudinally aligned with the downstream lateral spacings to facilitate cutting of the body in a longitudinal direction through an aligned upstream and downstream lateral spacing of the body.

40. The gap blocker of claim 1 wherein the body includes upstream open-ended slots laterally spacing the upstream leg portions apart from one another; and
wherein the body includes downstream open-ended slots laterally spacing the downstream leg portions apart from one another.

41. The gap blocker of claim 2 wherein the body has a unitary, one-piece construction.

42. The gap blocker of claim 2 wherein the upstream leg portions include at least three upstream leg portions and the upstream lateral spacings include at least two upstream lateral spacings; and
wherein the downstream leg portions include at least three downstream leg portions and the downstream lateral spacings include at least two downstream lateral spacings.

43. The gap blocker of claim 2 wherein the upstream lateral spacings each include an upstream spacing maximum lateral width and the upstream leg portions each have an upstream leg portion maximum lateral width larger than the upstream spacing maximum lateral width of at least one adjacent upstream lateral spacing; and
wherein the downstream lateral spacings each include a downstream spacing maximum lateral width and the downstream leg portions each have a downstream leg portion maximum lateral width larger than the downstream spacing maximum lateral width of at least one adjacent downstream lateral spacing.

44. The gap blocker of claim 2 wherein the upstream leg portions include at least four upstream leg portions; and
wherein the downstream leg portions include at least four downstream leg portions.

45. The gap blocker of claim 11 wherein the body has a unitary, one-piece construction.

46. The gap blocker of claim 11 wherein the upstream open-ended slots each include an upstream open-ended slot maximum lateral width and the upstream leg portions each have an upstream leg portion maximum lateral width larger than the upstream open-ended slot maximum lateral width of at least one adjacent upstream open-ended slot; and
wherein the downstream open-ended slots each include a downstream open-ended slot maximum lateral width and the downstream leg portions each have a downstream leg portion maximum lateral width larger than the downstream open-ended slot maximum lateral width of at least one adjacent downstream open-ended slot.

47. The gap blocker of claim 11 wherein the upstream leg portions include at least four upstream leg portions; and
wherein the downstream leg portions include at least four downstream leg portions.

\* \* \* \* \*